(12) United States Patent
Putman et al.

(10) Patent No.: US 11,995,802 B2
(45) Date of Patent: May 28, 2024

(54) SYSTEM, METHOD AND APPARATUS FOR MACROSCOPIC INSPECTION OF REFLECTIVE SPECIMENS

(71) Applicant: Nanotronics Imaging, Inc., Cuyahoga Falls, OH (US)

(72) Inventors: Matthew C. Putman, Brooklyn, NY (US); John B. Putman, Celebration, FL (US); John Moffitt, Los Banos, CA (US); Michael Moskie, San Jose, CA (US); Jeffrey Andresen, Gilroy, CA (US); Scott Pozzi-Loyola, Watsonville, CA (US); Julie Orlando, Akron, OH (US)

(73) Assignee: Nanotronics Imaging, Inc., Cuyahoga Falls, OH (US)

(*) Notice: Subject to any disclaimer, the term of this patent is extended or adjusted under 35 U.S.C. 154(b) by 0 days.

(21) Appl. No.: 18/324,334

(22) Filed: May 26, 2023

(65) Prior Publication Data

US 2023/0316465 A1 Oct. 5, 2023

Related U.S. Application Data

(63) Continuation of application No. 17/664,535, filed on May 23, 2022, now Pat. No. 11,663,703, which is a
(Continued)

(51) Int. Cl.
*G06T 5/70* (2024.01)
*G06T 5/50* (2006.01)
(Continued)

(52) U.S. Cl.
CPC ............... *G06T 5/70* (2024.01); *G06T 5/50* (2013.01); *G06T 7/0002* (2013.01); *H04N 23/56* (2023.01);
(Continued)

(58) Field of Classification Search
CPC ... G06T 5/70; G06T 5/50; G06T 7/0002; G06T 2207/10056; G06T 2207/20221;
(Continued)

(56) References Cited

U.S. PATENT DOCUMENTS

| | | | |
|---|---|---|---|
| 4,647,764 | A | 3/1987 | Chadwick et al. |
| 5,172,005 | A | 12/1992 | Cochran et al. |

(Continued)

FOREIGN PATENT DOCUMENTS

| | | |
|---|---|---|
| CN | 103189896 | 7/2013 |
| CN | 103197599 A | 7/2013 |

(Continued)

OTHER PUBLICATIONS

Office Action from Chinese Patent Application No. 201980063455.9, dated Dec. 30, 2023, 11 pages.
(Continued)

*Primary Examiner* — Allen C Wong
(74) *Attorney, Agent, or Firm* — DLA PIPER LLP (US)

(57) ABSTRACT

An inspection apparatus includes a specimen stage, one or more imaging devices and a set of lights, all controllable by a control system. By translating or rotating the one or more imaging devices or specimen stage, the inspection apparatus can capture a first image of the specimen that includes a first imaging artifact to a first side of a reference point and then capture a second image of the specimen that includes a second imaging artifact to a second side of the reference point. The first and second imaging artifacts can be cropped from the first image and the second image respectively, and the first image and the second image can be digitally stitched together to generate a composite image of the specimen that lacks the first and second imaging artifacts.

20 Claims, 18 Drawing Sheets

Related U.S. Application Data continuation of application No. 17/170,260, filed on Feb. 8, 2021, now Pat. No. 11,341,617, which is a continuation of application No. 16/705,674, filed on Dec. 6, 2019, now Pat. No. 10,915,992.

(60) Provisional application No. 62/883,931, filed on Aug. 7, 2019.

(51) Int. Cl.
*G06T 7/00* (2017.01)
*H04N 23/56* (2023.01)
*H04N 23/695* (2023.01)
*H04N 23/90* (2023.01)

(52) U.S. Cl.
CPC ........... *H04N 23/695* (2023.01); *H04N 23/90* (2023.01); *G06T 2207/10056* (2013.01); *G06T 2207/20221* (2013.01); *G06T 2207/30168* (2013.01)

(58) Field of Classification Search
CPC ........ G06T 2207/30168; H04N 23/695; H04N 23/56; H04N 23/90
USPC .......................................................... 348/79
See application file for complete search history.

(56) References Cited

U.S. PATENT DOCUMENTS

| | | | |
|---|---|---|---|
| 5,197,105 A | 3/1993 | Uemura et al. | |
| 5,544,256 A | 8/1996 | Brecher et al. | |
| 5,689,620 A | 11/1997 | Kopec et al. | |
| 5,829,698 A | 11/1998 | Canada | |
| 5,917,588 A | 6/1999 | Addiego | |
| 5,952,657 A | 9/1999 | Alexander et al. | |
| 6,021,380 A | 2/2000 | Fredriksen et al. | |
| 6,201,892 B1 | 3/2001 | Ludlow et al. | |
| 6,272,235 B1 | 8/2001 | Bacus et al. | |
| 6,487,307 B1 | 11/2002 | Hennessey et al. | |
| 6,630,996 B2 | 10/2003 | Rao et al. | |
| 6,775,004 B1 | 8/2004 | Putman | |
| 7,176,433 B1 | 2/2007 | Rosengaus | |
| 7,227,628 B1 | 6/2007 | Sullivan et al. | |
| 7,253,946 B2 | 8/2007 | Bellouard et al. | |
| 7,457,446 B2 | 11/2008 | Soenksen | |
| 7,724,362 B1 | 5/2010 | Rosengaus | |
| 9,769,392 B1 | 9/2017 | Colburn et al. | |
| 9,922,429 B2 | 3/2018 | Milne et al. | |
| 10,048,477 B1 | 8/2018 | Putman et al. | |
| 10,545,096 B1 | 1/2020 | Putman et al. | |
| 2002/0093812 A1 | 7/2002 | Kiest et al. | |
| 2002/0158643 A1 | 10/2002 | Mllalobos | |
| 2005/0111086 A1 | 5/2005 | Knoblich et al. | |
| 2005/0190361 A1 | 9/2005 | Ishiba et al. | |
| 2005/0270638 A1 | 12/2005 | Soenksen | |
| 2006/0199287 A1 | 9/2006 | Fu et al. | |
| 2007/0177136 A1 | 8/2007 | Nakano et al. | |
| 2007/0206183 A1 | 9/2007 | Lebens | |
| 2008/0030731 A1 | 2/2008 | Jin et al. | |
| 2009/0015831 A1 | 1/2009 | Yguerabide et al. | |
| 2010/0039818 A1 | 2/2010 | Haddock | |
| 2011/0297847 A1 | 12/2011 | Courtney et al. | |
| 2012/0013899 A1 | 1/2012 | Amanullah | |
| 2013/0038727 A1 | 2/2013 | Clark | |
| 2013/0076887 A1 | 3/2013 | Ito et al. | |
| 2013/0077892 A1 | 3/2013 | Ikeno et al. | |
| 2014/0056497 A1 | 2/2014 | Hsieh et al. | |
| 2014/0063222 A1 | 3/2014 | Putman et al. | |
| 2014/0232831 A1 | 8/2014 | Shi et al. | |
| 2014/0319379 A1 | 10/2014 | Manian | |
| 2015/0062320 A1* | 3/2015 | Tunnell ................. | H04N 23/74 356/300 |
| 2015/0092253 A1 | 4/2015 | Kasahara et al. | |
| 2015/0133778 A1 | 5/2015 | Barriga Rivera et al. | |
| 2015/0204798 A1 | 7/2015 | Nygaard et al. | |
| 2015/0355103 A1 | 12/2015 | Ando | |
| 2016/0219163 A1 | 7/2016 | Shirado et al. | |
| 2016/0314350 A1 | 10/2016 | Mathieu | |
| 2016/0379079 A1 | 12/2016 | Han | |
| 2017/0140524 A1 | 5/2017 | Karsenti et al. | |
| 2017/0270651 A1 | 9/2017 | Bailey et al. | |
| 2017/0299370 A1 | 10/2017 | Rempel | |
| 2017/0330315 A1 | 11/2017 | Okuda | |
| 2018/0060702 A1 | 3/2018 | Ma et al. | |
| 2018/0087898 A1 | 3/2018 | Akagi et al. | |
| 2018/0088306 A1 | 3/2018 | Suzuki | |
| 2018/0135063 A1 | 5/2018 | Calabotta et al. | |
| 2018/0135093 A1 | 5/2018 | Ashby et al. | |
| 2018/0231752 A1 | 8/2018 | Putman et al. | |
| 2018/0232752 A1 | 8/2018 | Badereddin et al. | |
| 2020/0021738 A1 | 1/2020 | Bendall et al. | |
| 2020/0089954 A1* | 3/2020 | Zia .......................... | G06V 20/64 |
| 2021/0035658 A1* | 2/2021 | Neumann .............. | G16H 20/60 |
| 2021/0042884 A1 | 2/2021 | Putman et al. | |
| 2021/0195086 A1 | 6/2021 | Baba et al. | |

FOREIGN PATENT DOCUMENTS

| | | |
|---|---|---|
| CN | 203480189 U | 3/2014 |
| CN | 103631011 B | 9/2015 |
| CN | 105869179 A | 8/2016 |
| CN | 107427243 | 12/2017 |
| CN | 108603835 A | 9/2018 |
| CN | 112033971 A | 12/2020 |
| DE | 102017125799 A1 | 5/2019 |
| EP | 3396450 A1 | 10/2018 |
| ES | 2297896 T3 | 5/2008 |
| JP | H06109660 A | 4/1994 |
| JP | 200011153 A | 1/2000 |
| JP | 2000136916 A | 5/2000 |
| JP | 2001198115 A | 7/2001 |
| JP | 3215858 B2 | 10/2001 |
| JP | 2003243465 A | 8/2003 |
| JP | 200510042 A | 1/2005 |
| JP | 2005010042 A | 1/2005 |
| JP | 2005-507489 | 3/2005 |
| JP | 2006294969 A | 10/2006 |
| JP | 2007192759 A | 8/2007 |
| JP | 2011510289 A | 3/2011 |
| JP | 2011156035 A | 8/2011 |
| JP | 201283282 A | 4/2012 |
| JP | 2012083282 A | 4/2012 |
| JP | 2012136916 A | 7/2012 |
| JP | 2012215394 A | 11/2012 |
| JP | 2016020867 A | 2/2016 |
| TW | 201819896 A | 6/2018 |
| TW | 201820188 A | 6/2018 |
| TW | 201908872 A | 3/2019 |
| TW | 202123168 A | 6/2021 |
| WO | 0240970 | 5/2002 |
| WO | 2009020456 A1 | 2/2009 |
| WO | 2009081969 A1 | 7/2009 |
| WO | 2009090633 A2 | 7/2009 |
| WO | 2017196885 A1 | 11/2017 |
| WO | 2019011678 A1 | 1/2019 |
| WO | 2023287992 A1 | 1/2023 |

OTHER PUBLICATIONS

Office Action and Search Report from Taiwan Patent Application No. 108136371, dated May 31, 2023, 12 pages.
Office Action for Japanese Patent Application No. 2021519816, dated Jun. 30, 2023, 10 Pages.
Extended European Search Report for Application No. 20850347.4, dated Jul. 6, 2023, 8 Pages.
Office Action for European Patent Application No. 20850347.4, dated Jul. 25, 2023, 1 Page.
Office Action for Chinese Patent Application No. 202080055920.7, dated Oct. 31, 2023, 10 pages.
Office Action for Taiwan Patent Application No. 20200123674, dated Sep. 18, 2023, 8 Pages.

(56) References Cited

OTHER PUBLICATIONS

Office Action for Japanese Patent Application No. 2022506529, dated Jun. 16, 2023, 3 pages.
Extended European Search Report for European Application No. 19871812.4, dated Jul. 8, 2022, 12 Pages.
International Preliminary Report on Patentability for International Application No. PCT/US2019/054386, dated Apr. 22, 2021, 8 Pages.
International Preliminary Report on Patentability for International Application No. PCT/US2020/040255, dated Feb. 17, 2022, 08 Pages.
International Search Report and Written Opinion for International Application No. PCT/US2007/024224, dated May 9, 2008, 8 Pages.
International Search Report and Written Opinion for International Application No. PCT/US2019/054386, dated Jan. 2, 2020, 9 Pages.
International Search Report and Written Opinion for International Application No. PCT/US2020/040255, dated Sep. 28, 2020, 09 Pages.
International Search Report and Written Opinion for International Application No. PCT/US2022/037152, dated Oct. 28, 2022, 10 Pages.
Nikon: "NWL200: Nikon's Newest and Most Sophisticated Wafer Loader for IC Inspection Microscopes," NWL200 Upright Microscopes Industrial Microscopes; Nikon Metrology, Aug. 15, 2018, 4 Pages.
Office Action and Search Report from Taiwan Patent Application No. 111126556, dated May 24, 2023, 11 pages.
Office Action for Japanese Patent Application No. 2022506529, dated Feb. 17, 2023, 14 Pages.
SEMISYN: "MIL-Micro MACRO Inspection Loader; Microscope Automatic Loader With Frontside and Backside Wafer Inspection," Aug. 15, 2018, 6 Pages.
Zitova B., et al., "Image Registration Methods: A Survey," Image and Vision Computing, Oct. 11, 2003, vol. 21, No. 11, pp. 977-1000.
Office Action from Taiwan Patent Application No. 111126556, dated Jan. 5, 2024, 4 pages.
Office Action for Taiwan Patent Application No. 109123674, mailed Jan. 3, 2024, 4 Pages.
Office Action for Japanese Patent Application No. 2023116989, mailed Apr. 5, 2024, 9 pages.

\* cited by examiner

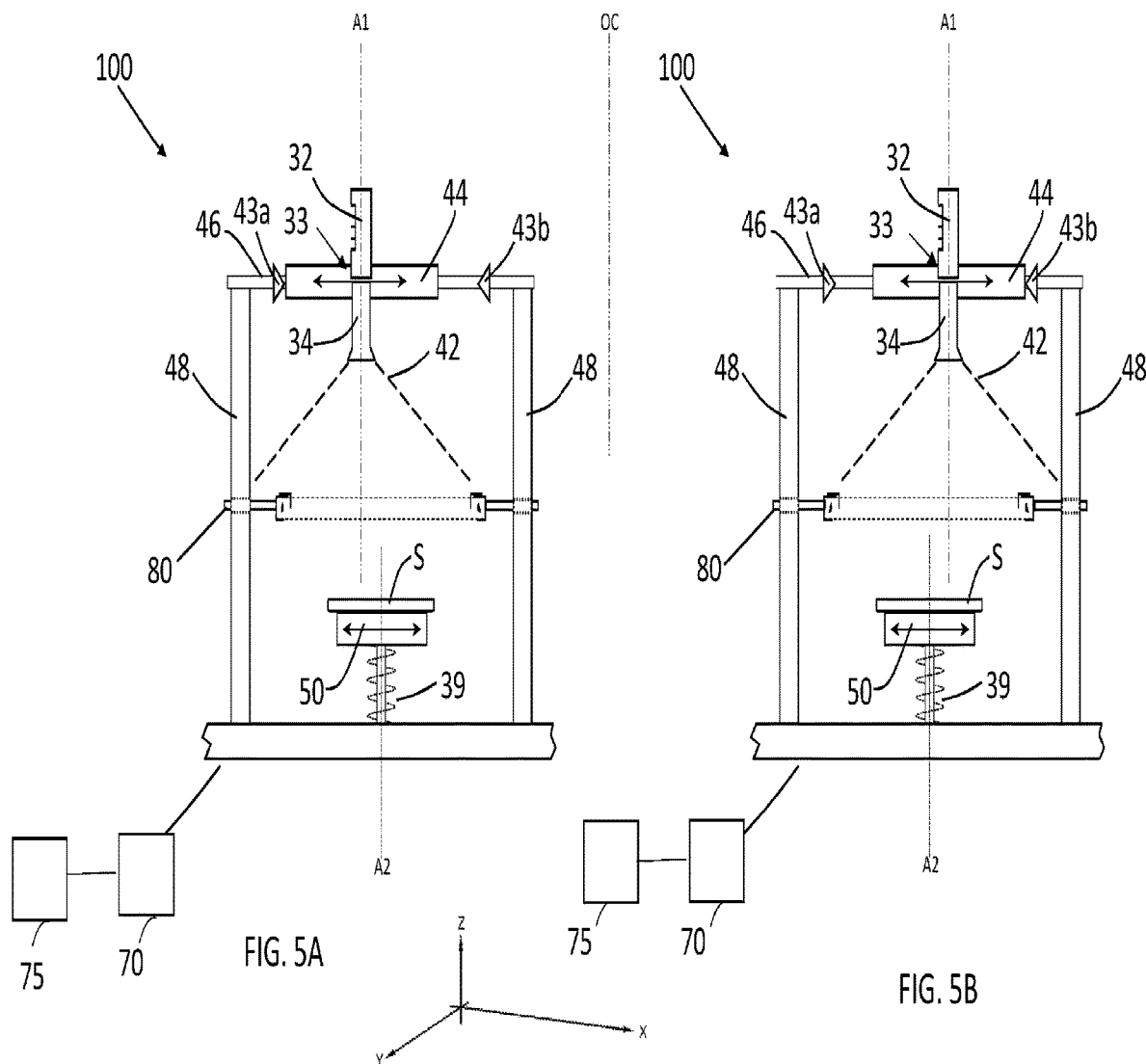

SYSTEM, METHOD AND APPARATUS FOR MACROSCOPIC INSPECTION OF REFLECTIVE SPECIMENS

CROSS-REFERENCE TO RELATED APPLICATIONS

This application is a continuation of U.S. patent application Ser. No. 17/664,535, filed May 23, 2022, which is a continuation of U.S. patent application Ser. No. 17/170,260, filed Feb. 8, 2021, now U.S. Pat. No. 11,341,617, issued May 24, 2022, which is a continuation of U.S. patent application Ser. No. 16/705,674, filed Dec. 6, 2019, now U.S. Pat. No. 10,915,992, issued Feb. 9, 2021, which claims priority to U.S. Provisional Patent Application No. 62/883,931, filed Aug. 7, 2019, which are incorporated by reference in their entireties.

TECHNICAL FIELD

The present disclosure generally relates to macroscopic inspection systems, apparatus and methods for imaging reflective specimens.

BACKGROUND OF THE INVENTION

When performing macroscopic examination of a specimen (i.e., imaging, in a single field of view, a specimen, or an area of a specimen 200 mm or greater) that is made of reflective material (e.g., glass, mirror, optical lenses, semiconductor wafers, etc.): (1) the reflection of an imaging device positioned above the specimen can reflect off of the specimen and appear in the image captured by the imaging device; and (2) illumination directed at the specimen can reflect off of the specimen and appear as hot spots in the captured image. These imaging artifacts (i.e., the reflection of the imaging device and/or the illumination hot spots) are undesirable.

FIG. 1A shows an illumination source 16 that provides an illumination space 18 that illuminates specimen S. Imaging device 10 and focusing lens 12 form imaging assembly 13 and define an imaging space 14 that is captured by imaging assembly 13. FIG. 1B shows an image tile 22 captured by imaging assembly 13. Within image tile 22 is an image of a specimen 24 and a darkspot 26 at the center. The darkspot can be a result of imaging assembly 13's reflection in the image or a shadow from illumination 16.

Accordingly, it is desirable to provide a new mechanism for macroscopic examination of a specimen that eliminates these undesirable imaging artifacts and can provide for multiple modes of illumination including, but not limited to brightfield, darkfield or oblique illumination; polarized light; cross-polarized light; and differential interference contrast (DIC), phase contrast. It is also desirable that each mode of illumination provides variable illumination landscapes, as explained herein, to detect features of a specimen. For purposes of this specification, macroscopic refers to an area approximately 0.5 cm 2 or greater in a single field of view. Specimens as understood by a person of ordinary skill in the art refer to an article of examination (e.g., a semiconductor wafer or a biological slide), and features refer to known characteristics of a specimen, as well as abnormalities and/or defects. Features can include but are not limited to: circuits, circuit board components, biological cells, tissue, defects (e.g., scratches, dust, fingerprints).

SUMMARY OF INVENTION

In one example, an inspection apparatus includes a specimen stage that is configured to retain a specimen, one or more imaging devices positioned above the specimen stage to capture images of the specimen, a set of lights on a platform between the specimen stage and the one or more imaging devices, a control system coupled to the specimen stage, the one or more imaging devices, and the platform, where the control system comprises one or more processors; and memory storing executable instructions that, as a result of being executed by the one or more processors, cause the control system to: provide first instructions to the one or more imaging devices to capture a first image of the specimen, the first image comprising a first imaging artifact to a first side of a reference point, provide second instructions to the one or more imaging devices to capture a second image of the specimen, the second image comprising a second imaging artifact to a second side of the reference point; crop the imaging artifact from the first image and the second image, and to digitally stitch together the first image and the second image to generate a composite image of the specimen, the composite image lacking the first imaging artifact and the second imaging artifact.

In some examples, the the executable instructions further cause the control system to translate the one or more imaging devices in a first direction to a first position above and to the first side of the reference point to capture the first image and to translate the one or more imaging devices in a second direction to a second position above and to the second side of the reference point to allow the one or more imaging devices to capture the second image.

In some examples, the executable instructions cause the control system to translate the specimen stage in a first direction to a first position under and to the first side of the reference point to capture the first image of the specimen and to translate the specimen stage in a second direction to a second position under and to the second side of the reference point to capture the second image of the specimen.

In some examples, the reference point is positioned along a centerline of the specimen.

In some examples, the specimen stage or the one or more imaging devices are moveable along a rotational axis.

In some examples, the one or more imaging devices include a first imaging device positioned above and to the first side of the reference point and a second imaging device positioned above and to the second side of the reference point and the inspection apparatus further includes an aperture slider positioned below the first imaging device and the second imaging device, the aperture slider comprising an aperture to allow capture of images of the specimen using either the first imaging device or the second imaging device.

In some examples, the executable instructions cause the control system to translate the aperture slider to a first position such that the aperture is aligned with the first imaging device to capture the first image and to translate the aperture slider to a second position such that the aperture is aligned with the second imaging device to capture the second image.

In some examples, the executable instructions cause the control system to translate the platform, activate one or more combinations of the set of lights to determine an illumination profile, analyze the first image of the specimen to identify a specimen classification, select, based on the specimen classification, the illumination profile, and adjust the platform and the set of lights according to the illumination profile.

In some examples, the inspection apparatus includes a barrier configured to diffuse light reflected from the specimen retained on the specimen stage back onto the specimen.

In some examples, the executable instructions cause the control system to compare a first overlap area of the first image to a second overlap area of the second image to determine that a matching image has been identified to allow for digital stitching of the first image and the second image.

In one example, a method includes receiving a specimen on a specimen stage of an inspection apparatus, identifying a reference point of the specimen, capturing a first image of the specimen that includes a first imaging artifact to a first side of the reference point, capturing a second image of the specimen that includes a second imaging artifact to a second side of the reference point, evaluating the second image of the specimen to determine that the second image can be used with the first image, cropping the first imaging artifact from the first image and the second imaging artifact from the second image; and digitally stitching together the first image and the second image to generate the composite image of the specimen, the composite image lacking the first imaging artifact and the second imaging artifact.

In some examples, the method further includes translating an imaging device of the inspection apparatus in a first direction to a first position above and to the first side of the reference point to capture the first image, and translating the imaging device of the inspection apparatus in a second direction to a second position above and to the second side of the reference point to capture the second image.

In some examples, the method further includes translating the specimen stage in a first direction to a first position under and to the first side of the reference point to capture the first image, and translating the specimen stage to a second position in a second direction to a position under and to the second side of the reference point to capture the second image.

In some examples, the method further includes rotating the specimen stage to a first position to capture the first image, cropping the first image to remove a first portion of the first image that includes the first imaging artifact, rotating the specimen stage to a second position to capture the second image, cropping the second image to remove a second portion of the second image that includes the second imaging artifact, and digitally rotating the second image to initiate evaluation of the second image.

In some examples, the method further includes translating an aperture slider of the inspection apparatus in a first direction to position an aperture below a first imaging device of the inspection apparatus to capture the first image, where the first imaging device is positioned above and to the first side of the reference point, and translating the aperture slider of the inspection apparatus in a second direction to position the aperture below a second imaging device of the inspection apparatus to capture the second image, where the second imaging device is positioned above and to the second side of the reference point.

In some examples, the method further includes translating a platform of the inspection system, where a set of lights are disposed on the platform, activating one or more combinations of the set of lights to determine an illumination profile, analyzing the first image of the specimen to identify a specimen classification, selecting, based on the specimen classification, the illumination profile, and adjusting the platform and the set of lights according to the illumination profile.

In some examples, the method further includes rotating an imaging device of the inspection apparatus in a first direction to position the imaging device to the first side of the reference point to capture the first image, and rotating the imaging device of the inspection apparatus in a second direction to position the imaging device to the second side of the reference point to capture the second image.

In some examples, the method further includes diffusing light reflected from the specimen retained on the specimen stage back onto the specimen.

In some examples, the method further includes comparing a first overlap area of the first image to a second overlap area of the second image to determine that a matching image has been identified to allow for digital stitching of the first image and the second image.

In some examples, the specimen stage is moveable along an X axis, a Y axis, a Z axis, and a rotational axis.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting in their scope, the principles herein are described and explained with additional specificity and detail through the use of the accompanying drawings in which:

FIG. 5A shows a macro inspection system comprising an imaging translation platform in a first position for capturing a first image of a specimen according to some embodiments of the disclosed subject matter;

FIG. 5B shows a macro inspection system comprising an imaging translation platform translated to a second position for capturing a second image of a specimen to create an artifact-free image of the specimen according to some embodiments of the disclosed subject matter;

DETAILED DESCRIPTION OF ILLUSTRATIVE EMBODIMENTS

In accordance with some embodiments of the disclosed subject matter, mechanisms (which can include systems, methods, devices, apparatuses, etc.) for macroscopic examination of reflective specimens are provided. Macroscopic examination (sometimes referred to as inspection) refers to scanning, imaging, analyzing, measuring and any other suitable review of a specimen using the disclosed macroscopic inspection mechanism. The disclosed macroscopic inspection mechanism includes one or more modes of illumination that can each provide variable illumination landscapes, as described herein. Although the following description refers to components and methods implemented in a macroscopic inspection mechanism, the components and methods described herein can also be implemented in a microscope inspection system.

Figure 1A:
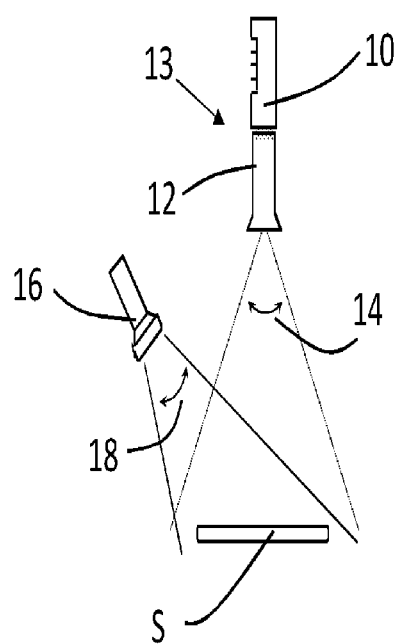
FIG. 1A shows an illumination source that provides an illumination space that illuminates a specimen.
Figure 1B:
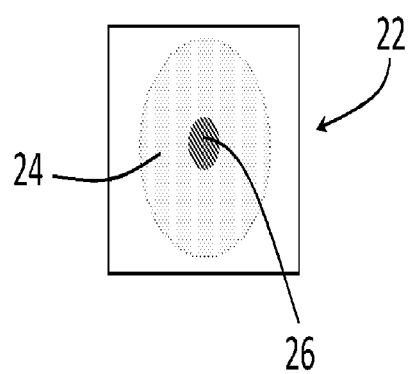
FIG. 1B shows an image tile captured by an imaging assembly.
Figure 2:
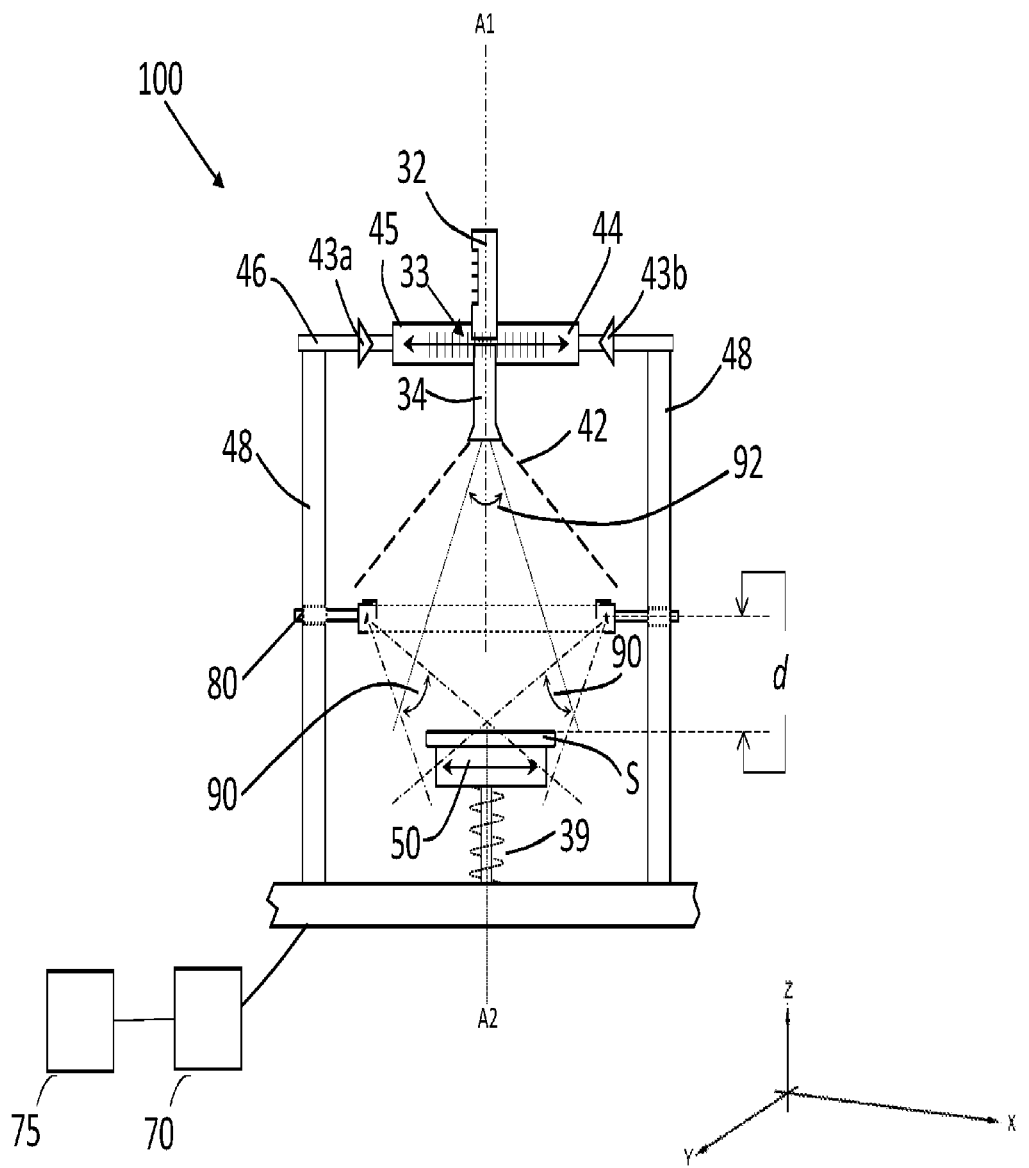
FIG. 2 shows an example of a macroscopic (macro) inspection system according to some embodiments of the disclosed subject matter.

FIG. 2 illustrates an example of a macroscopic (macro) inspection system 100 according to some embodiments of the disclosed subject matter. At a high level, the basic components of macro inspection system 100, according to some embodiments, include an illumination assembly (e.g., light ring assembly 80) for providing light to a specimen S, a focusing lens 34, an imaging device 32, a specimen stage 50, a control system 70 comprising hardware (e.g., one or more processors configured to perform operations described herein, etc.), software, and/or firmware and a computer analysis system 75. Macro inspection system 100 can be implemented as part of an optical inspection system that uses transmitted or reflected light.

Figure 3A:
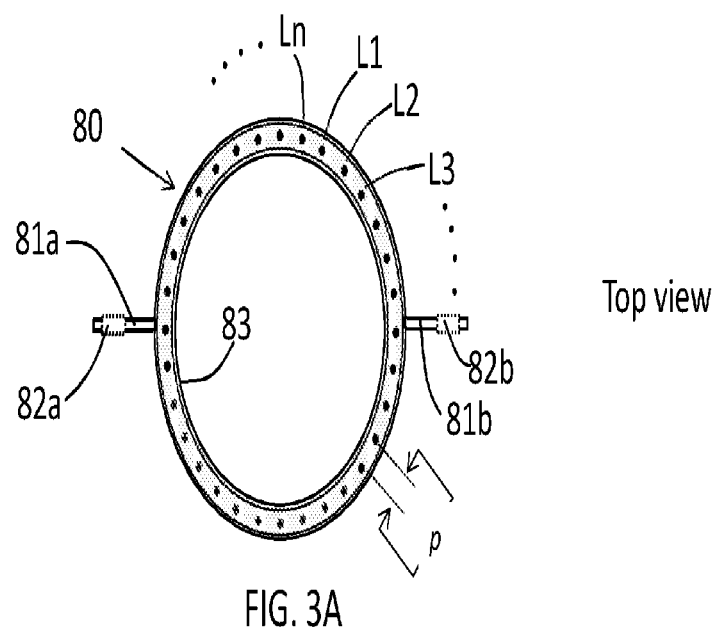
FIG. 3A shows a top view of a light ring assembly according to some embodiments of the disclosed subject matter.
Figure 3B:
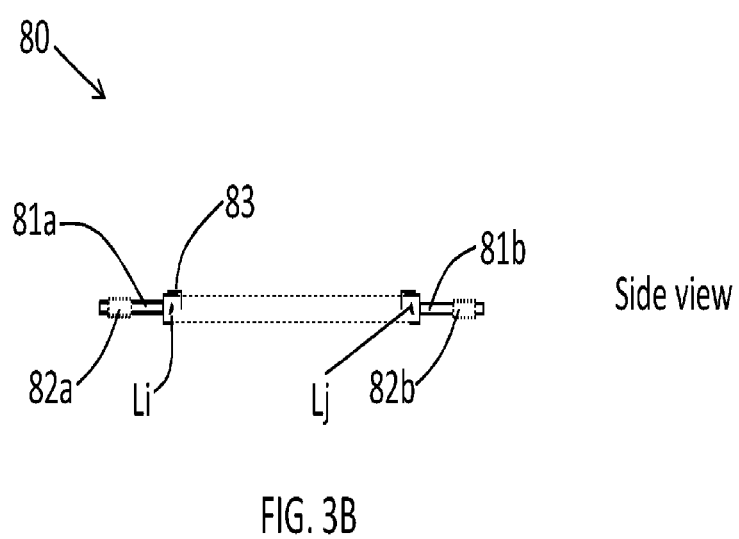
FIG. 3B shows a side view of a light ring assembly according to some embodiments of the disclosed subject matter.

In some embodiments, as shown in FIGS. 2, 3A and 3B, a light ring assembly 80 can be used as an illumination assembly for macro inspection system 100 to provide light to a specimen (as represented by illumination space 90). One or more individual lights (e.g., LED lights L1 to Ln) can be mounted to light ring assembly 80. Individual lights L1 to Ln can be based on any type of suitable lighting technology, including but not limited to: light emitting diode (LED), organic light emitting diode (OLED), fluorescent, halogen, incandescent, fiber optic, gas-plasma, cathode ray tube (CRT), liquid crystal display (LCD), laser, etc. Each light can be individually addressed. In further embodiments, the individual lights can be divided into sections (e.g., by position on the light ring assembly, such as front, back, right, left), and each section can be addressable. Software, hardware and/or firmware (e.g., control system 70) can control the activation, intensity and/or color of each light or section by its address. For instance, the control system 70 an comprise one or more processors and memory that stores instructions that, as a result of being executed by the one or more processors, cause the control system 70 to perform the operations described herein. In some instances, the control system 70 is implemented as an application or as a stand-alone computer system that performs the operations described herein. Activation refers to the turning on of a light, intensity refers to the rate at which light energy is delivered to a unit of surface, and color refers to an RGB (red, green, blue) color value, for example, where each color value is specified as an integer from 0 to 255 based on 8-bit color, for example. Intensity can be determined by light meters, image sensors and/or other suitable intensity measurement devices. Plurality of lights L1 to Ln can be comprised of lights that project monochromatic, polychromatic and/or any combination thereof Each light L1 to Ln can provide oblique lighting at different angles of incidence, from multiple directions, in accordance with some embodiments of the disclosed subject matter. Three methods for varying the angles of illumination, as described herein, include: (1) changing the angle of a light mounted to light ring assembly 80; (2) raising or lowering light ring assembly 80 in a z direction; and/or (3) positioning a light deflector such that part of the illumination beam from a light is blocked.

In one embodiment, each light can be mounted to light ring assembly 80 at a desired angle relative to the specimen plane of a specimen when retained on specimen stage 50. In further embodiments, each light's angle can be controlled manually, or automatically by software, hardware, and/or firmware (e.g., control system 70). A light's angle can be controlled individually or concurrently with one or more other lights. Each light can be angled the same or different amounts.

In some embodiments, light ring assembly 80 can be configured so that it is movable along guiderails 48 of macro inspection system 100. In one example, light ring assembly 80 can be attached to guiderails 48 with support rods 81a and 81b and bearings 82a and 82b (as shown in FIG. 3A). Note, that the illumination assembly is not limited to a ring formation. For example, other types of light formations are possible as described in U.S. patent application Ser. No. 16/262,017 entitled "Macro Inspection Systems, Apparatus and Methods," which is hereby incorporated by reference herein in its entirety. Further, the movement of light ring assembly 80 to different positions along the height of the guiderails 48 can be controlled manually, or automatically by software, hardware, and/or firmware (e.g., control system 70). Depending on its height in relation to specimen stage 50, light ring assembly 80 can be used to provide oblique or darkfield illumination to a specimen when retained on specimen stage 50. For example, to provide variable angles of oblique illumination, light ring assembly 80 can be positioned so that its light can be projected at different heights above a specimen plane (i.e., the top planar surface of a specimen when positioned on specimen stage 50). In some embodiments, the specimen plane corresponds with a focal plane of macro inspection system 100 (i.e., the plane where the specimen is in focus). In further examples, to provide darkfield illumination, light ring assembly 80 can be positioned so that its light can be projected at the same, or substantially the same, level of the specimen plane of a specimen on specimen stage 50 to provide darkfield illumination to a specimen when retained on specimen stage 50.

As used herein: oblique illumination refers to light projected toward the specimen at an angle of incidence less than 90 degrees and greater than 0 degrees, typically greater than 1 degrees; darkfield illumination refers to light projected toward the specimen at an angle of incidence less than 1 degrees and typically 0 degrees; and brightfield illumination refers to light projected toward the specimen at an angle of incidence perpendicular (90 degrees) to the plane of the specimen. Brightfield illumination can refer to a light source that provides illumination through lens 34.

Depending on its distance (d) in relation to specimen stage 50, light ring assembly 80 can be used to provide oblique or darkfield illumination to a specimen when retained on specimen stage 50. Providing oblique and darkfield lighting is described in U.S. patent application Ser. No. 16/262,017 entitled "Macro Inspection Systems, Apparatus and Methods," which is hereby incorporated by reference herein in its entirety. In some embodiments, light ring assembly 80 can be positioned so that illumination from the assembly is substantially parallel to a specimen plane to provide darkfield illumination to a specimen when retained on specimen stage 50. Substantially parallel is to be understood as having an angle of incidence from $-1°$ to $+1°$, to allow for imperfections in alignment, but in some embodiments, the illumination will be on plane, i.e., at a d of 0, whereby illumination will be reflected only if there are features extending off of a perfectly flat planar surface of a specimen. If a specimen is perfectly flat and featureless, then it would not reflect any of the substantially parallel illumination to lens 34, and such a specimen viewed by lens 34 will not be illuminated. If there are protruding imperfections or other features, then the illumination from light ring assembly 80 will reflect off of such imperfections and/or features and will be captured by imaging device 32 via lens 34. If its distance from specimen stage 50 is greater than 0, then light ring assembly 80 can be used to provide oblique illumination to a specimen when retained on specimen stage 50.

Figures 4A, 4B, 4C:
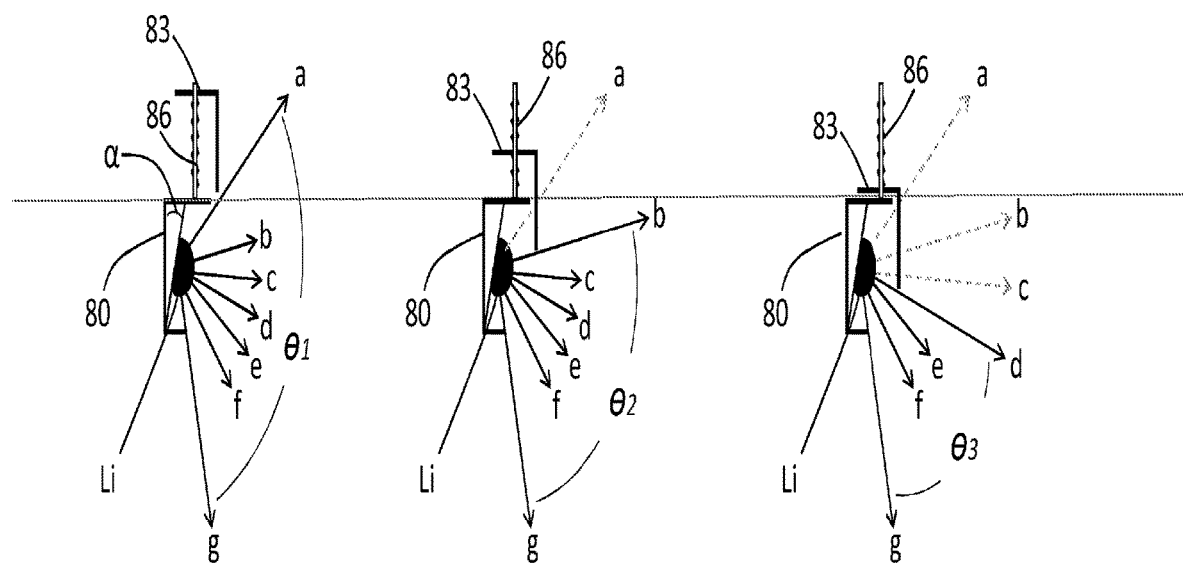
FIG. 4A shows a cone of illumination resulting from a maximum, unrestricted illumination beam for illumination of a specimen according to some embodiments of the disclosed subject matter.
FIG. 4B shows a minimization of a cone of illumination resulting from movement of a light deflector to a first position according to some embodiments of the disclosed subject matter.
FIG. 4C shows a minimization of a cone of illumination resulting from movement of a light deflector to a second position according to some embodiments of the disclosed subject matter.

As shown in FIGS. 4A-4C, light deflector 83 can be used for adjusting the cone of illumination for each light Li. Each light Li can be mounted at an angle $\alpha$ from light ring assembly 80. Light ring assembly 80 can be positioned perpendicular to specimen stage 50, and lights can be mounted at an angle $\alpha$ from 0 to 90 degrees, typically between 0 to 60 degrees (e.g., 10 degrees). A typical LED light can have a cone of illumination of approximately 120 degrees. The cone of illumination is represented by any two vectors a, b, c, d, e, f and g. Vectors a and g represent the maximum, unrestricted illumination beam as seen in FIG. 4A. The cone of illumination of the unrestricted light is represented by $\theta 1$. As shown, for example, in FIGS. 4B and 4C, light deflector 83 can be positioned over the lights, to minimize the cone of illumination. FIG. 4B shows light deflector 83 moved to a first position to block vector a (represented by a dotted line) and allow light vectors b through g to continue. The cone of illumination of this restricted light is represented by $\theta 2$, and has a smaller cone than $\theta 1$. FIG. 4C shows light deflector 83 moved to a second position, blocking vectors a, b and c (represented by dotted lines) and allowing vectors d, e, f and g to continue. The cone of illumination of this restricted light is $\theta 3$, and its cone of illumination is smaller than both $\theta 1$ and $\theta 2$. $\alpha$ and $\theta$ can be adjusted to provide an angle of illumination that illuminates the specimen to show specific specimen features. For example, higher angles of illumination are generally better for defining edges, while lower angles of illumination are generally better for defining bumps. In some embodiments, a single light deflector is used to control the cone of illumination for all the lights, and in other embodiments, individual light deflectors can be used to control the cone of illumination for each light. The cone of illumination for each light can be the same or different.

While deflector 83, as shown in FIGS. 4A-4C, is lowered from top to bottom, it can also be configured to move from bottom to top, or in both directions. Regardless of the features that are being examined, deflector 83 can be positioned to prevent light from being directed to the imaging device and causing imaging artifacts in captured images. In some embodiments, deflector 83 can be positioned to direct light only to a specimen. In embodiments where a dome is included in macro inspection system 100, deflector 83 can be adjusted to deflect light to the dome, to the specimen, and/or to the dome and the specimen. Single or individual light deflectors 83 can be controlled manually, or automatically by software, hardware, and/or firmware (e.g., control system 70). Adjustor screw 86, as shown in FIGS. 4A-4C, is one example of a mechanism that can be used to adjust light deflector 83.

In some embodiments, an XYZθ translation stage can be used for specimen stage 50. Specimen stage 50 can be driven by stepper motor, server motor, linear motor, piezo motor, and/or any other suitable mechanism, including a manual mechanism. Specimen stage 50 can be configured to move an object in the X axis, Y axis, Z axis and/or θ directions manually and/or under the control of any suitable controller (e.g., control system 70). An actuator (e.g. actuator 39) can be used to make coarse focus adjustments of, for example, 0 to 5 mm, 0 to 10 mm, 0 to 30 mm, and/or any other suitable range(s) of distances. An actuator can also be used in some embodiments to provide fine focus of, for example, 0 to 50 μm, 0 to 100 μm, 0 to 200 μm, and/or any other suitable range(s) of distances. A person of skill in the art would understand that XYZθ translation stage is just an example, and other suitable stages can be used (e.g., an XYZ translation stage, a θ translation stage, a Z translation stage).

In some embodiments, lens 34 and imaging device 32, which together form imaging assembly 33, can be supported on a translation assembly above specimen stage 50. Translation assembly includes imaging translation platform 44, which can be configured to move imaging assembly 33 in the X axis, Y axis and/or θ directions manually and/or under the control of any suitable controller (e.g., control system 70). Upper support frame 46 can also include limits (e.g., left and right limits 43a and 43b) and/or encoder 45 for aligning imaging translation platform 44. The limits can be physical stops or switches (optical, mechanical, electronic or other) to indicate proper alignment of imaging translation platform 44. The switches can be controlled by control system 70 to only allow images to be taken when imaging translation platform 44 is in a particular alignment or to automatically capture images when the limit switches are activated (e.g., by positioning imaging translation platform 44 within limits 43a and 43b). Encoder 45 can be used to more precisely indicate the position of platform 44, and can be used to only allow imaging or to automatically trigger imaging when platform 44 is at a particular position. In some embodiments, upper support frame 46 can be configured so that it is movable along guiderails 48 in the Z axis direction. To adjust focus, upper support frame 46 can be lowered or raised, bringing imaging assembly 33, which is coupled to support frame 46, closer to or farther apart from specimen stage 50. Further, the movement of upper support frame 46 to different positions along the height of the guiderails 48 can be controlled manually, or automatically by software, hardware, and/or firmware (e.g., control system 70). In other embodiments, the imaging device can be mounted directly to upper support frame 46, and be translatable in the X axis, Y axis, Z axis and/or θ directions in a similar manner.

Lens 34 can have different magnification powers, and/or be configured to operate with brightfield, darkfield or oblique illumination, polarized light, cross-polarized light, differential interference contrast (DIC), phase contrast and/or any other suitable form of illumination. The type of lens used for macro inspection system 100 can be based on desired characteristics, for example, field of view, numerical aperture, among others. In some embodiments, lens 34 can be a macro lens that can be used to view a specimen within a single field of view. Note, the term field of view as understood by a person of ordinary skill in the art refers to an area of examination that is captured at once by an image sensor.

The illumination of a specimen on specimen stage 50 reflects up to lens 34 mounted to an imaging device 32 (e.g., a camera), and imaging device 32 can capture images and/or video of a specimen in imaging space 92. In some embodiments, imaging device 32 can be a rotatable camera that includes an image sensor, configured to allow the camera to be aligned to a specimen, a stage and/or a feature on a specimen. The image sensor can be, for example, a charged-coupled device (CCD), a complementary metal-oxide semi-conductor (CMOS) image sensor, and/or any other suitable electronic device that converts light into one or more electrical signals. Such electrical signals can be used to form images and/or video of an object. In some embodiments, such electrical signals are transmitted for display on a display screen connected to macro inspection system 100. Some example methods for rotating a camera that can be used by macro inspection system 100 are described in U.S. Pat. No. 10,048,477 entitled "Camera and Object Alignment to Facilitate Large Area Imaging in Microscopy," which is hereby incorporated by reference herein in its entirety.

In some embodiments, macro inspection system 100 can include a barrier, for example dome 42, as shown in FIG. 2, configured to reflect light that is reflected from the specimen back toward the specimen. Dome 42 diffuses the light that it reflects back to the specimen to provide a more uniform illumination field. Although a dome-shaped barrier is shown, other shaped barriers, including: sphere, cone, cube or any three dimensional poly-sided shape such as a rhombohedron, can be used to provide different angles of diffusion. In some embodiments, a light diffuser is formed in the shape of a dome or other shaped barrier, and in other embodiments, the dome, or other barrier, can be any material, but painted with light diffusing paint. Dome 42 can be coupled to imaging assembly 33, so that when imaging assembly 33 is moved, dome 42 moves along with it.

A single light or multiple lights can be activated to illuminate a portion or an entire field of view at the specimen plane. The type of specimen being examined, the type of feature being examined, a region of interest on a specimen, and/or any other suitable criteria, can determine which lights are activated and at what color and/or intensity. Further, software, hardware and/or firmware (e.g., control system 70) can control the angle of each individual light or concurrently with one or more other lights. In some embodiments, the angles can be changed manually. Each light can be angled the same or different amounts. In some embodiments, light is not directed at dome 42, but at the specimen, and is reflected off of dome 42 back to the specimen in a more diffuse manner.

Each individual light can individually or together emit a vector of light to illuminate a particular area on the specimen plane)"area of illumination"(. The magnitude of this area of illumination can vary from illuminating a portion of the specimen to encompassing the entire specimen plane. The area of illumination can be calculated at different axial locations above, below or on the specimen plane (e.g., at the top of specimen stage 50, at the top of the specimen plane, at the focal plane, etc.) along the beam of light represented by the vectors. The areas covered by each vector of light can either be overlapping in part with the areas covered by the vector of light emitted from a neighboring light bar or not overlapping at all. In some embodiments, one or more focusing lenses and/or collimating lenses can be used to focus the area of each light vector to a region suitable for a specimen on specimen stage 50.

In some embodiments, a single illumination vector ranges from 1 degree or more to 180 degrees or less (60 or more to 10,800 or less minutes of arc). In other embodiments, a single illumination vector ranges from 45 degrees or more to 120 degrees or less (2,700 or more to 7,200 or less minutes of arc), in other embodiments, from 30 degrees or more to 45 degrees or less (1,800 or more to 2,700 or less minutes of arc), in other embodiments, from 10 degrees or more to 30 degrees or less (600 or more to 1,800 or less minutes of arc), in other embodiments, from 5 degrees or more to 10 degrees or less (300 or more to 600 or less minutes of arc), and, in other embodiments, from 2 degrees or more to 5 degrees or less (120 or more to 300 or less minutes of arc). The vector depends upon the number and position of activated lights of light assembly ring 80 relative to the position of the specimen.

Light ring assembly 80 can vary as to the number of lights, the size of each individual light, the cone angle of each individual light, the pitch (p) between lights and the distance between the lights and the area where the light is projected. In some embodiments, the size of specimen stage 50, the specifications of lens 34, the size and/or type of specimen being inspected, and/or the features of a specimen that are being examined, can determine the configuration of lights on light assembly ring 80, including, for example, the arrangement of lights (whether in a ring or in other arrangements), the total number of lights, the distance, and/or the pitch (p).

As should be generally appreciated from the examples of illumination in FIGS. 4A-4C, the various embodiments of the present invention allow for darkfield illumination, illumination at variable oblique angles and brightfield illumination.

In some embodiments, control system 70 includes a controller and controller interface, and can control any settings of macro inspection system 100 (e.g., intensity of lights, color of lights, turning on and off one or more lights, pivoting or other movement of one or more lights (e.g., changing a light's angle), movement of light ring assembly 80 (e.g., in a z direction), movement of imaging platform 44; movement of specimen stage 50 or 150 (in x, y, 0, and/or z directions), movement of lens 34 (in x, y, θ, and/or z directions), movement of imaging translation platform 44, recording of image data by imaging assembly 33, rotation or movement of imaging assembly 33, processing of illumination data, processing of image data). Control system 70 and applicable computing systems and components described herein can include any suitable hardware (which can execute software in some embodiments), such as, for example, computers, microprocessors, microcontrollers, application specific integrated circuits (ASICs), field-programmable gate arrays (FPGAs) and digital signal processors (DSPs) (any of which can be referred to as a hardware processor), encoders, circuitry to read encoders, memory devices (including one or more EPROMS, one or more EEPROMs, dynamic random access memory) "DRAM" (, static random access memory)"SRAM"(, and/or flash memory), and/or any other suitable hardware elements. In some embodiments, individual components within macro inspection system 100 can include their own software, firmware, and/or hardware to control the individual components and communicate with other components in macro inspection system 100.

In some embodiments, communication between the control system (e.g., the controller and controller interface) and the components of macro inspection system 100 can use any suitable communication technologies, such as analog technologies (e.g., relay logic), digital technologies (e.g., RS232, ethernet, or wireless), network technologies (e.g., local area network (LAN), a wide area network (WAN), the Internet, Bluetooth technologies, Near-field communication technologies, Secure RF technologies, and/or any other suitable communication technologies.

In some embodiments, operator inputs can be communicated to control system 70 using any suitable input device (e.g., keyboard, mouse, joystick, touch).

In some embodiments, control system 70 controls the activation, intensity and/or color of one or more of the plurality of lights, as well as the position of lights L1 to Ln and/or light ring assembly 80 (e.g., by adjusting the light ring assembly's height, or by pivoting a light) to provide for variable illumination landscapes on a specimen when it is placed on specimen stage 50. Illumination landscape refers to the color and/or intensity of light on a region of interest of a specimen as a result of the activation and distribution of light from the one or more of the plurality of lights that is directed towards a specimen. The illumination landscape can affect the image viewed through lens 34 and/or images captured by imaging device 32. Control system 70 can control the intensity of one or more of the plurality of lights to provide a desired illumination landscape on a specimen plane and/or specimen stage 50. For example, control system 70 can control the intensity of one or more of the plurality of lights to provide an illumination landscape of uniform intensity on a specimen plane and/or specimen stage 50. The type of illumination landscape provided can be determined by the specimen type, mechanical and/or physical properties of a specimen (e.g., specimen size, specimen reflectivity), a specimen feature being examined, a particular stage of a manufacturing and/or examining process, or some other suitable variable, individually or in any combination thereof.

In some embodiments, computer analysis system 75 can be coupled to, or included in, macro inspection system 100 in any suitable manner using any suitable communication technology, such as analog technologies (e.g., relay logic), digital technologies (e.g., RS232, ethernet, or wireless), network technologies (e.g., local area network (LAN), a wide area network (WAN), the Internet) Bluetooth technologies, Near-field communication technologies, Secure RF technologies, and/or any other suitable communication technologies. Computer analysis system 75, and the modules within computer analysis system 75, can be configured to perform a number of functions described further herein using images output by macro inspection system 100 and/or stored by computer readable media.

Computer analysis system 75 can include any suitable hardware (which can execute software in some embodiments), such as, for example, computers, microprocessors, microcontrollers, application specific integrated circuits (ASICs), field-programmable gate arrays (FPGAs), and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements.

It should be noted that while the control system 70 and the computer analysis system 75 are illustrated in FIG. 2 as being separate components of the macro inspection system 100, other implementations of the control system 70 and the computer analysis system 75 are within the scope of the present disclosure. For instance, in an embodiment, the computer analysis system 75 is implemented as an application or other executable process of the control system 70. Further, while the computer analysis system 75 is illustrated as being a component of the macro inspection system 100, the computer analysis system 75 can be implemented as a separate system accessed over a communications network, such as the Internet or other network.

Computer-readable media can be any non-transitory media that can be accessed by the computer and includes both volatile and nonvolatile media, removable and non-removable media. By way of example, and not limitation, computer readable media can comprise computer storage media and communication media. Computer storage media can include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Figure 6A:
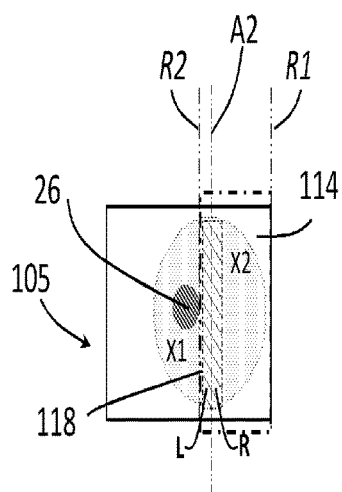
FIG. 6A shows a first image of a specimen captured at a first position using stage translation, imaging assembly platform translation or aperture translation according to some embodiments of the disclosed subject matter.
Figure 6B:
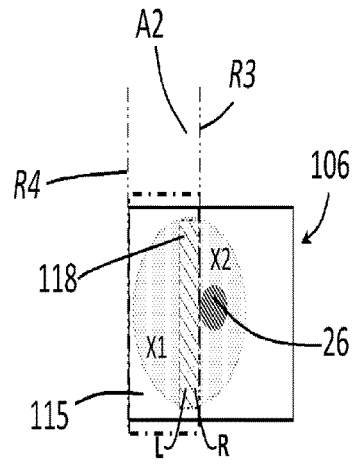
FIG. 6B shows a second image of a specimen captured at a second positing using stage translation, imaging assembly platform translation or aperture translation according to some embodiments of the disclosed subject matter.
Figure 6C:
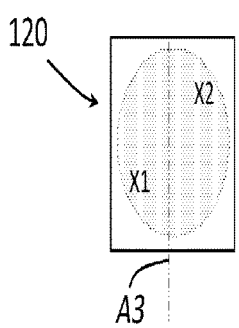
FIG. 6C shows an artifact-free image of a specimen created by stitching the first image of the specimen and the second image of the specimen according to some embodiments of the disclosed subject matter.

FIGS. 5A and 5B, along with FIGS. 6A-6C, show embodiments of macro inspection system 100 and an imaging method for creating an artifact-free image of a specimen by translating imaging translation platform 44 to the right and left of a specimen centerline A2, when placed on stage 50. By translating imaging translation platform 44, optical centerline A1 of imaging assembly 33 can be offset from the centerline A2 of a specimen that is placed on stage 50. The offset amount must be sufficient, so that the entire imaging artifact, or the entire imaging artifact and some additional space, will appear in a captured image on one side of specimen centerline A2 (e.g., as shown in FIGS. 6A and 6B). Note, the size of the offset of A1 of the image assembly from centerline A2 (so that at least the entire artifact appears on one side of centerline A2) is typically equal to the size of the artifact as it appears in the captured image.

All references to moving or tranlating imaging assembly 33 in this application refers to moving or translating imaging assembly 33 via a translation mechanism (e.g., imaging translation platform 44). Also the figures herein refer to using a centerline A1 or A2, there are just example reference points, other reference points can be used to capture article-free images.

FIGS. 6A, 6B and 6C show images that can be captured under three different modes: stage translation, imaging assembly platform translation or aperture translation.

Artifact-free as used herein refers to an image that does not include the reflection of an imaging assembly and/or illumination hot spots. Note, embodiments of macro inspection system 100, as shown in FIGS. 5A and 5B, do not show imaging space 92, or illumination space 90, but the concepts of imaging and illumination spaces as shown in FIG. 2 apply to all embodiments.

As shown in FIGS. 5A and 5B, imaging translation platform can be translated between two positions: to the right and to the left of specimen centerline A2. In FIG. 5A, imaging translation platform 44 is positioned to the left of centerline A2, so that when imaging assembly 33 captures an image of a specimen at that position, an imaging artifact from the reflection of imaging assembly 33 does not appear to the right of centerline A2. FIG. 6A illustrates an example image 105 that can be captured when imaging assembly is positioned to the left of centerline A2 (as shown in FIG. 5A). As captured in image 105, specimen features X1 and X2 appear on the left and right sides of the centerline A2. Imaging artifact 26, representing the reflection of the imaging assembly captured in the image, appears on the left side (i.e., the same side that imaging assembly 33 was positioned when the image was captured). The portion of the image that is artifact-free is indicated by bounding box 114 (coincident with lines R1 on the right and R2 on the left).

In FIG. 5B, imaging translation platform 44 is positioned on the opposite side, to the right of centerline A2, so that when imaging assembly 33 captures an image of the specimen at that position, an imaging artifact from the reflection of imaging assembly 33 does not appear to the left of centerline A2. FIG. 6B illustrates an example image 106 that can be captured when imaging assembly is positioned to the right of centerline A2 (as shown in FIG. 5B). Imaging artifact 26 appears on the right side of image 106 (i.e., the same side that imaging assembly 33 was positioned when the image was captured). The portion of the image that is artifact-free is indicated by bounding box 114 (coincident with lines R3 on the right and R4 on the left).

Figure 7:
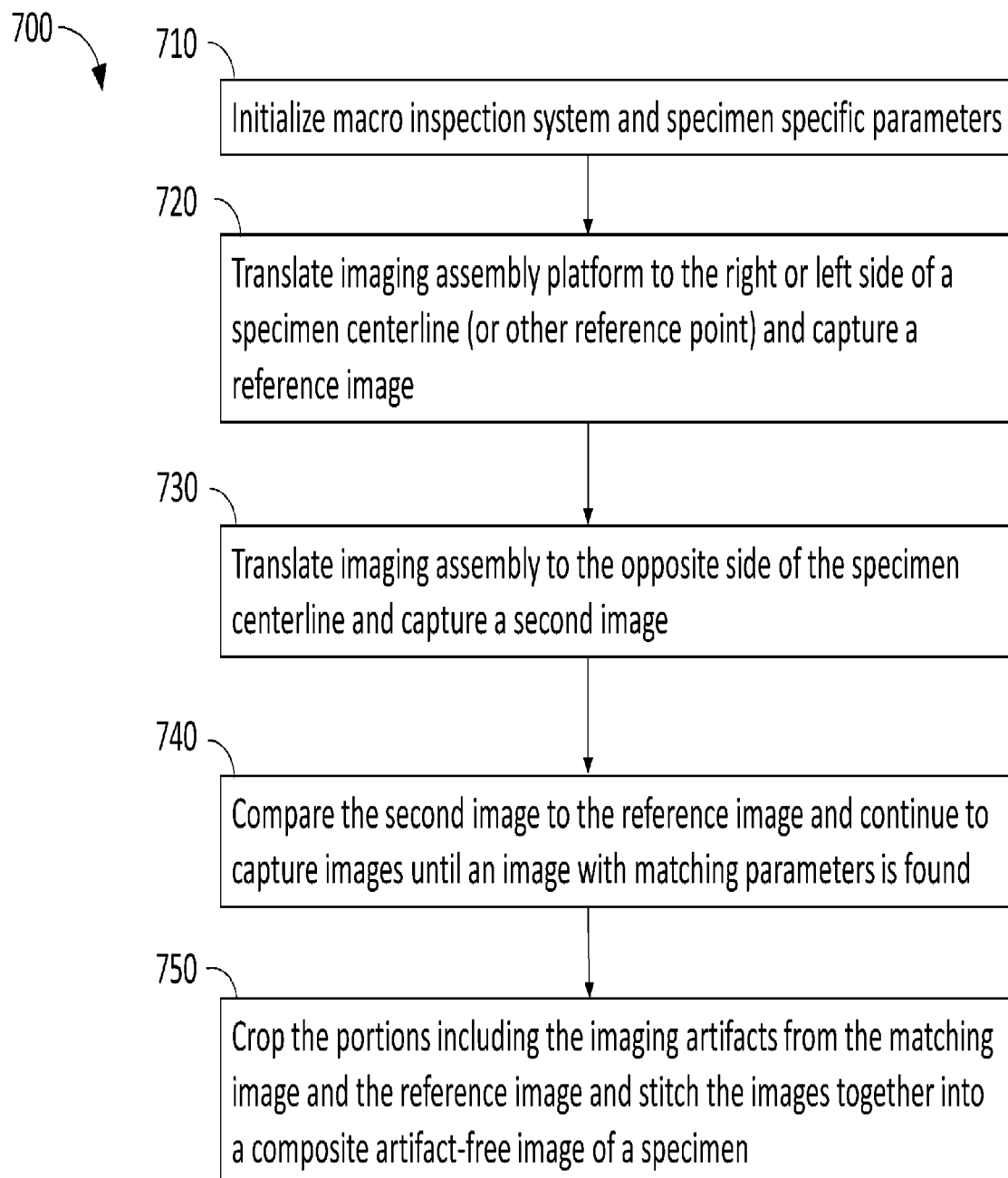
FIG. 7 shows an example imaging method for creating a composite artifact-free image of a specimen by translating an imaging assembly according to some embodiments of the disclosed subject matter.

FIG. 7 shows an example imaging method 700 for creating a composite artifact-free image of a specimen using embodiments of macro inspection system 100, as shown in FIGS. 5A and 5B.

At 710, macro inspection system 100 can be initialized by adjusting the parameters that are specific to the macro inspection tool, and not to the specimen being examined. Such parameters can include, but are not limited to, focus, magnification, DIC prism, field of view. Focus of inspection system 100 can be calibrated by using a sample specimen to determine a suitable distance between imaging assembly 33 and specimen stage 50, and moving imaging assembly 33 or specimen stage 50, or both, farther apart or closer together until the desired focus is achieved. Focus can be controlled manually, or automatically by software, hardware, and/or firmware (e.g., control system 70). The positions of imaging assembly 33 and stage 50, and the distance between them that are used at initialization can be stored in local or remote memory. A reference specimen, representing a specimen or a specimen classification group can also be used to set parameters specific to the specimen being examined. A specimen can be grouped by specimen type, by similar mechanical and/or physical specimen properties (e.g., similar reflectivity properties, similar size dimensions), by feature type, by manufacturing process and/or examination step, by region of interest and/or any other suitable classification group. Parameters specific to the specimen being examined can include magnification, focus, adjusting light exporsure, adjusting illumination (e.g., activating selected lights and adjusting the light's intensity level, color and/or angle of incidence of each selected light). Note, focus can be adjusted by changing the distance between the specimen and imaging assembly 33, e.g., by mechanism 39 that moves stage 50 in a z direction or by raising or lowering imaging assembly 33 in a z direction. Exposure can be set by adjusting the camera setting including exposure time, gain, offset, among others. The initial parameters for a specimen can be stored in local or remote memory. Example methods for adjusting illumination, include image processing, is described in U.S. patent application Ser. No. 16/262,017 entitled "Macro Inspection Systems, Apparatus and Methods," which is hereby incorporated by reference herein in its entirety.

At 720, imaging assembly 33 can be translated either to the right or left of centerline A2, an amount equal to or greater than the size of the artifact appearing in a captured imaged, and a reference image can be captured. As shown in FIGS. 6A and 6B, imaging artifact 26 appears in the reference image at the same side of centerline A2 as the position of imaging assembly 33 when it captured the reference image. The portion of the reference image on the opposite side of centerline A2 to imaging assembly 33 will be artifact-free. In some embodiments, imaging assembly 33 can be positioned far enough to the right or far enough to the left of centerline A2, so that in the captured image, imaging artifact 26 does not appear exactly at centerline A2, but there is additional space (L and R, respectively, of overlap 118, as shown in FIGS. 6A and 6B) between the imaging artifact and the centerline A2. Before capturing a reference image, a specimen can be aligned on stage 50, and imaging assembly 33 positioned in relation to stage 50, so that predetermined edges of a specimen or certain features of a specimen (individually or collectively, "specimen overlap feature") fall within an image overlap area 118 when an image of the specimen is captured by imaging assembly 33. The overlap area refers to a predetermined number of pixels (e.g., 1-10 pixels) in the same x, y location of an image captured by imaging assembly 33 when positioned on either side of centerline A2. The shaded areas of bounding box 114 (as shown in FIG. 6A) for image 105 and bounding box 115 (as shown in FIG. 6B) for image 106 represent an artifact-free area that is the same (or overlapping) in images captured by an imaging assembly when positioned to the right or the left of centerline A2. The overlapping areas of a reference image and a second image can be used to compare the two images and to select a second image that is most similar to the reference image with respect to magnification, focus and/or exposure. The reference image and the image selected to be most similar can be digitally stitched (also referred to as "stitched" or "stitching") together to form a composite artifact-free image of the specimen (e.g., image 120 as shown in FIG. 6C). As shown in FIG. 6C, A3 is a line selected in the overlap area.

At 730, imaging assembly 33 is translated to the other side of centerline A2, opposite to its position at step 720. In some embodiments, imaging assembly 33 is positioned far enough, to create additional space between imaging artifact 26 and centerline A2 (e.g., R or L of image overlap area 118).

At 740, once imaging assembly 33 is properly aligned, imaging assembly 33 captures an image of the specimen that includes an imaging artifact on the same side of centerline A2 as the position of imaging assembly 33 when capturing the image, and the image is artifact-free on the opposite side of the centerline. The overlap area 118 of the captured image can be compared to the overlap area of the reference image, and changes can be made to the focus, exposure, illumination and/or other parameters, so that the focus, exposure, illumination and/or other parameters of the reference image and the captured images are the same, or substantially similar. The comparison of overlap areas 118 can be performed manually or automatically by software, hardware, and/or firmware (e.g., by control system 70 and/or computer analysis system 75). Imaging assembly 33 can continue to capture images of a specimen until it is determined that a captured image matches the focus, exposure, illumination and/or other parameters of the reference image (the "matching image"). The portions of the reference image and the matching image that include the imaging artifacts can be cropped out of the images, so that the remaining portions are artifact-free (e.g., the area bounded by R1 and R2 in FIG. 6A, and the area bounded by R3 and R4 in FIG. 6B).

At 750, an artifact-free portion of thmatching image can be stitched together with an artifact-free portion of the reference image to form a composite artifact-free image of the specimen (e.g., image 120, as shown in FIG. 6C) Stitching can be performed by aligning the specimen overlap feature that appears in overlap area 118 of the reference image with the specimen overlap feature that appears in overlap area 118 of the matching image. Control system 70 and/or computer analysis system 75 can compare the overlapping areas of each image and digitally adjust the positions of the images so that the specimen overlap features are aligned. In other embodiments, where a specimen and imaging assembly 33 have been precisely aligned so that the overlapping areas of the captured images include the same features, stiching can be based on the exact location (e.g., the x/y coordinates) of the overlap area. In some embodiments, the artifact-free portions of the reference image and the matching image can be stitched together directly, without using any overlapping areas for alignment.

Figure 8:
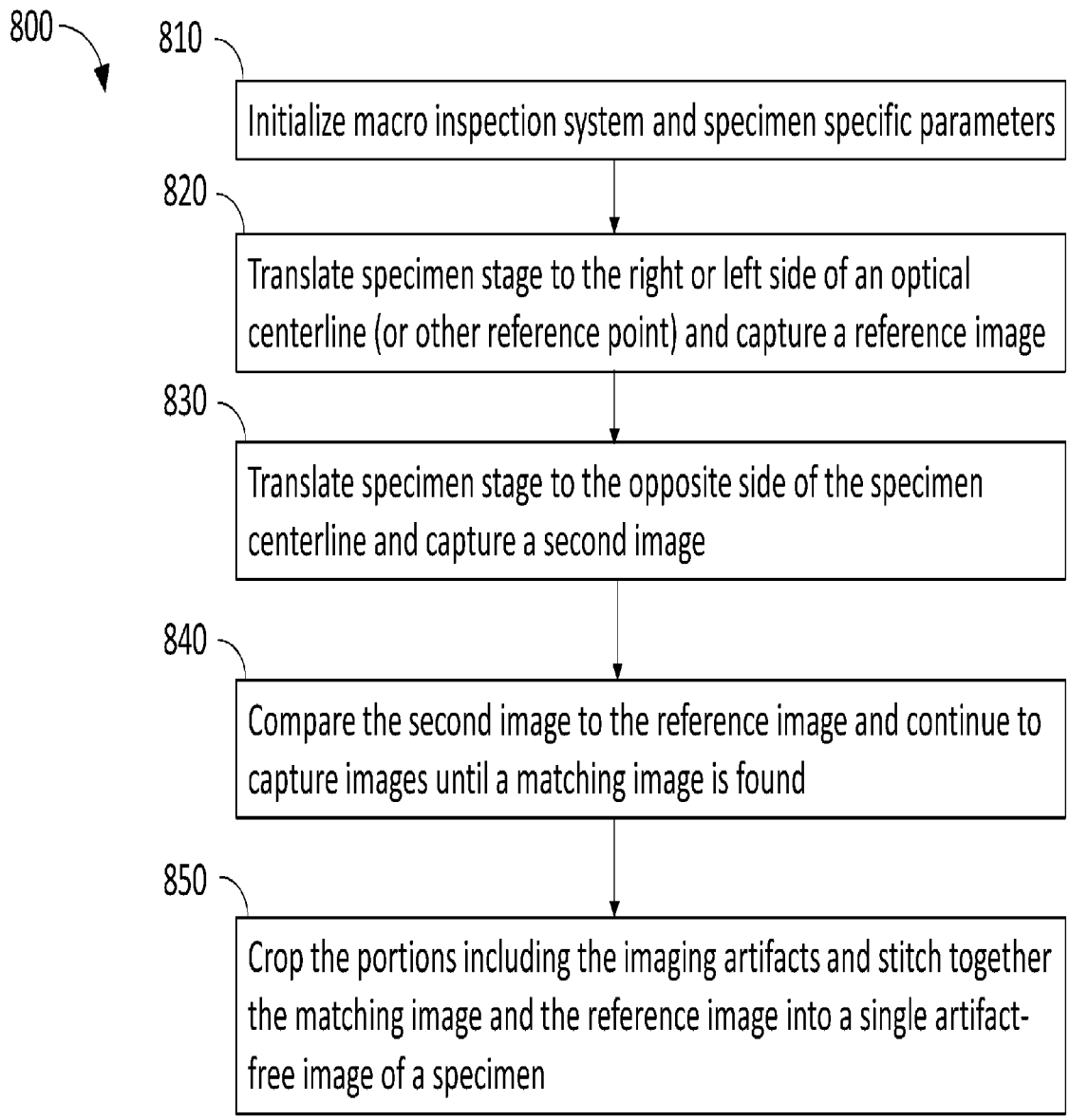
FIG. 8 shows an example imaging method for creating a composite artifact-free image of a specimen by translating a specimen stage according to some embodiments of the disclosed subject matter.

In another embodiment, imaging assembly 33 can remain fixed and specimen stage (i.e., centerline A2) can be translated to the left or right of imaging assembly 33 (i.e., optical centerline A1) an offset amount greater than or equal to the size of the artifact as discussed above. FIG. 8 shows an example imaging method 800 for creating an artifact-free image of a specimen by translating specimen stage 50.

Similar to the method described in connection with FIG. 7, the same process can be repeated (e.g., step 810 (initialize parameters for macro inspection tool and specimen being examined); step 840 (compare the reference image and a second image; if the images do not match, then make suitable adjustments to macro inspection system 100 until a matching image is captured) and 850 (crop out the portions of the matching image and the reference image that include the imaging artifacts and stitch together the artifact-free images)), except imaging assembly 33 remains fixed, and stage 50 is moved to the right or left of optical centerline A1 to capture images of a specimen on each side of the optical centerline (steps 820 and 830). Further, similar to the method described in connection with FIG. 7, steps 840 and 850 can be performed by the control system 70 and/or computer analysis system 75.

Figure 9:
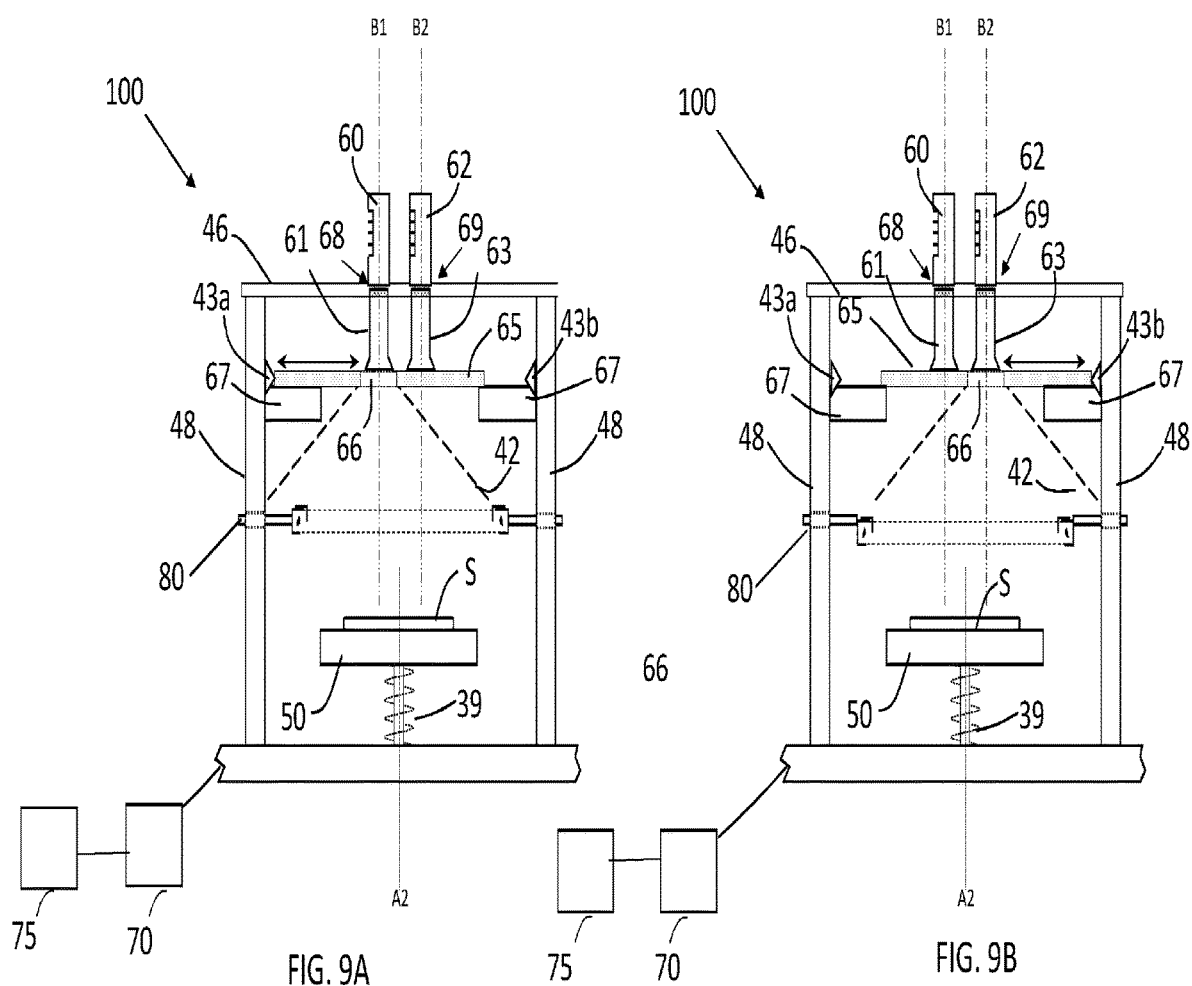
FIG. 9A shows a macro inspection system comprising two imaging assemblies and a translatable aperture slider for capturing a first image of a specimen at a first position according to some embodiments of the disclosed subject matter.
FIG. 9B shows a macro inspection system comprising two imaging assemblies and
a translatable aperture slider for capturing a second image of a specimen at a second position according to some embodiments of the disclosed subject matter.
Figure 10:
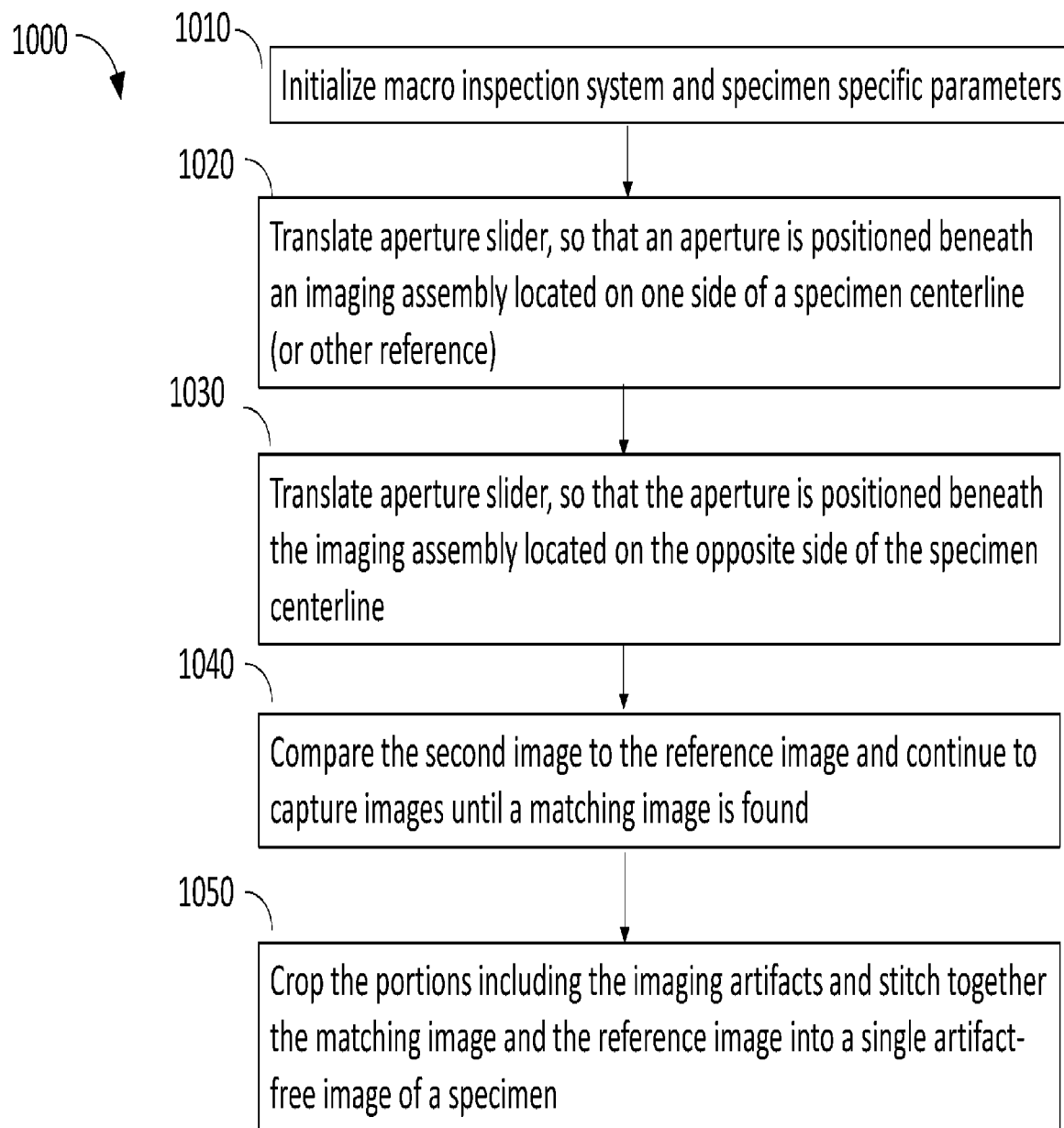
FIG. 10 shows an example imaging method for creating a composite artifact-free image of a specimen using two imaging assemblies and a translatable aperture slider according to some embodiments of the disclosed subject matter.

FIGS. 9A and 9B, along with FIG. 10, show embodiments of macro inspection system 100 and an imaging method for creating an artifact-free image of a specimen by using two imaging assemblies 68 and 69 and a translatable aperture slider 65.

As shown in FIGS. 9A and 9B, macro inspection system 100 can include: (i) two imaging assemblies 68 and 69, which are positioned, so that their optical centerlines B1 and B2 respectively, are offset from and on opposite sides of centerline A2; and (ii) a translatable aperture slider 65 having a single opening, aperture 66. The offset amount must be sufficient, so that the entire imaging artifact, or the entire imaging artifact and some additional space, will appear in a captured image on one side of specimen centerline A2 (i.e., on the same side as the imaging assembly taking the image).

In this configuration, the imaging assemblies and the specimen stage remain fixed, while aperture slider 65 can be translated in a linear motion to position aperture 66 beneath one imaging assembly (68 or 69) at a time. In FIG. 9A, aperture slider 65 is translated along aperture slider guide rails 67 so that aperture 66 is positioned beneath imaging assembly 68 (to the left of A2), and a portion of the remaining aperture slider 65 blocks imaging assembly 69 from being reflected in an image of a specimen captured by imaging assembly 68. Likewise, when aperture slider 65 is translated so that aperture 66 is positioned beneath imaging assembly 69 to the right of A2 (as shown in FIG. 9B), the remaining portion of aperture slider 65 blocks imaging assembly 68, so that imaging assembly 68 is not reflected in an image captured by imaging assembly 69. Aperture slider 65 can be controlled manually, or automatically by software, hardware, and/or firmware (e.g., control system 70). Further, aperture slider 65 can be designed to have the smallest possible diameter without obstructing the imaging field of either imaging assembly. In additional embodiments, a dome 42 can be coupled to aperture slider 65 and positioned with aperture 66 to diffuse the light reflected from the specimen.

Note, aperture slider 65 can be made of metal, plastic or other material that maintains its shape. In some embodiments, slider 65 is as thin as possible (typically one to five millimeters), so as not to interfere with imaging space 92. If a dome is not attached, slider 65 can be either a reflective material or a light absorbing material to prevent light from being reflected. Aperture 66 can be an unobstructed opening or fitted with a lens.

The image 105, as illustrated in FIG. 6A, can be captured when aperture 66 is positioned beneath imaging assembly 68 located to the left of centerline A2 (as shown in FIG. 9A). Imaging artifact 26 appears on the left side (i.e., the same side where aperture 66 was positioned when the image was captured). In contrast, the image 106, as illustrated in FIG. 6B, can be captured when aperture 66 is positioned beneath imaging assembly 69 located to the right of centerline A2 (as shown in FIG. 9B). Imaging artifact 26 appears on the right side (i.e., the same side where aperture 66 was positioned when the image was captured).

FIG. 10 shows an example imaging method 1000 for creating an artifact-free image of a specimen by translating an aperture slider using embodiments of macro inspection 100 shown in FIGS. 9A and 9B.

Similar to the method described in connection with FIG. 7, the same process can be repeated (e.g., step 1010 (initialize parameters for macro inspection tool and specimen being examined); step 1040 (compare the reference image and a second image, and make adjustments to macro inspection system 100 until a matching image is found) and 1050 (crop out the portions of the matching image and the reference image that include the imaging artifacts and stitch together the matching images)), but instead of moving an imaging assembly or a specimen stage to opposite sides of centerline A2, an aperture on a slider is positioned, in turn, beneath each imaging assembly (e.g., steps 1020 and 1030) to capture images of a specimen and stitch them together into a composite artifact-free image of the specimen. Further, similar to the method described in connection with FIG. 7, steps 1040 and 1050 can be performed by the control system 70 and/or computer analysis system 75.

Figure 11:
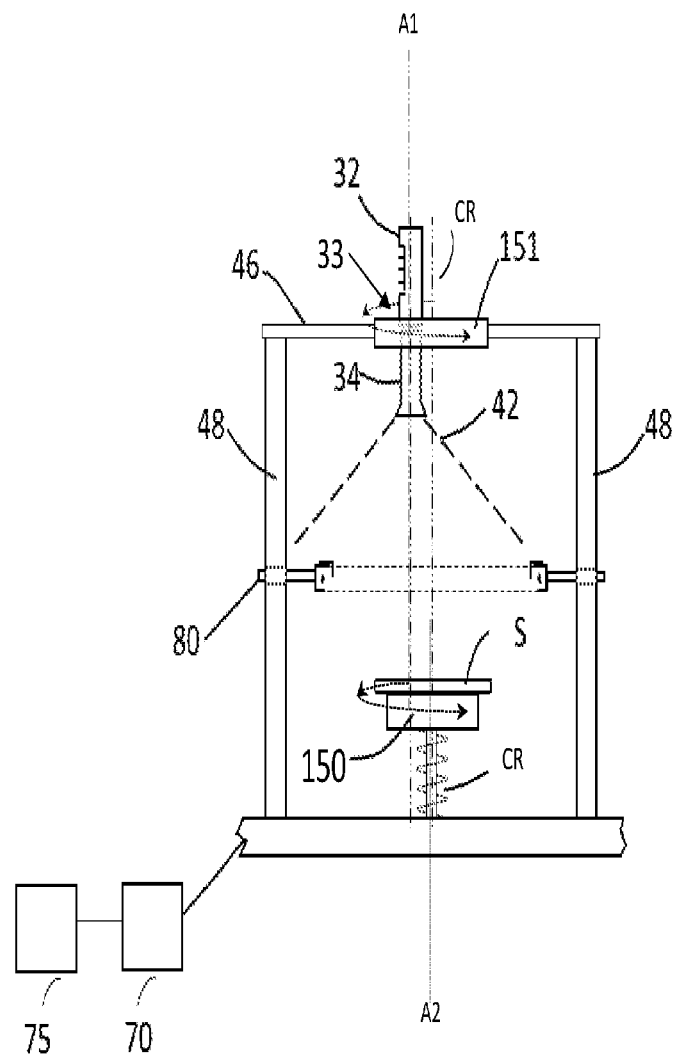
FIG. 11 shows a macro inspection system comprising a specimen stage and an imaging assembly that either or both can be rotated for creating an artifact-free image according to some embodiments of the disclosed subject matter.
Figure 12:
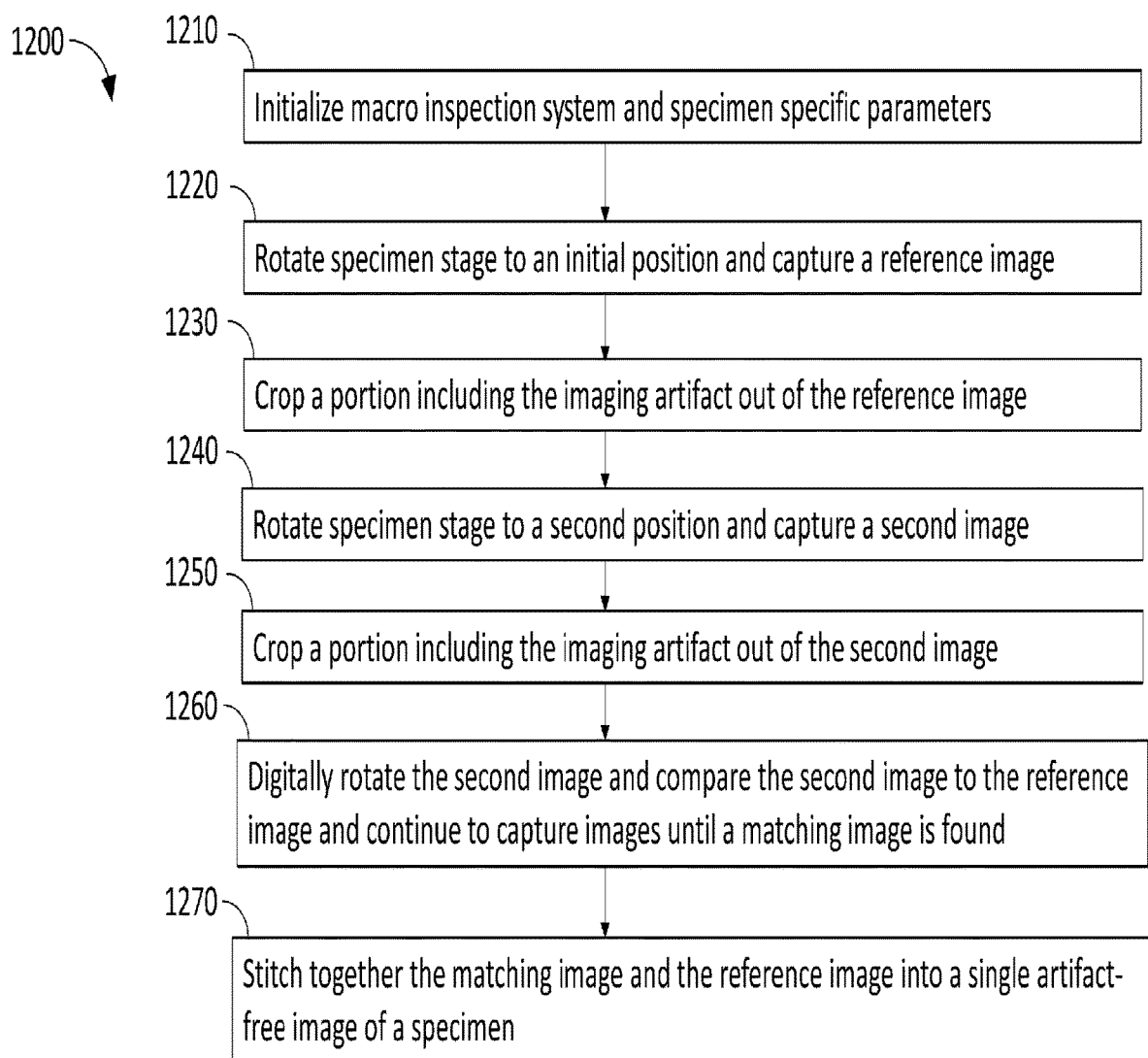
FIG. 12 shows a method for creating a composite artifact-free image of a specimen by rotating a specimen stage of a macro inspection system according to some embodiments of the disclosed subject matter.

FIG. 11, along with FIG. 12, show embodiments of macro inspection system 100 and an imaging method for creating an artifact-free image of a specimen by rotating a specimen stage 150 and/or an imaging translation platform 151 of the macro inspection system 100.

As shown in FIG. 11, imaging assembly 33 and dome 42 (if included) can be offset from stage 150 (also known as a 0 stage) so that the centerline of a specimen when placed on the stage is to the right (or to the left) of optical centerline A1. The offset amount must be sufficient, so that the entire imaging artifact, or the entire imaging artifact and some additional space, will appear in a captured image on one side of specimen centerline A2 (i.e., on the same side as the imaging assembly taking the image). Instead of translating imaging assembly 33 or stage 150 laterally (as shown in FIGS. 5A and 5B), either specimen stage 150 or imaging translation platform 151 can be rotated around the center of rotation, which is located at A2. Note, the center of rotation does not have to be aligned with the specimen centerline.

FIG. 12 shows an example imaging method 1200 for creating an artifact-free image of a specimen by rotating a specimen stage using embodiments of macro inspection 100 shown in FIG. 11.

At 1210, similar to the method described in connection with FIG. 7, the parameters for macro inspection system 100 and specimen specific parameters are initialized.

Figure 13A:
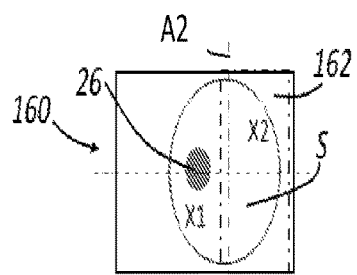
FIG. 13A shows an example image captured at an initial position of a specimen stage according to some embodiments of the disclosed subject matter.

At 1220, an image is captured at an initial position of rotating specimen stage 150. FIG. 13A shows an example image 160 that can be captured when specimen stage 150 (as shown in FIG. 11) is at an initial position. Image 160 shows a specimen having a feature X1 on the top right and a feature X2 on the bottom left. Artifact 26 appears on the left-hand portion of the image. Bounding box 162 indicates the portion of the image that does not include imaging artifact 26. Line A2 indicates the centerline of a specimen. Line A2 can also be used to vertically align the artifact-free images of a specimen to be stitched together.

Figure 13B:
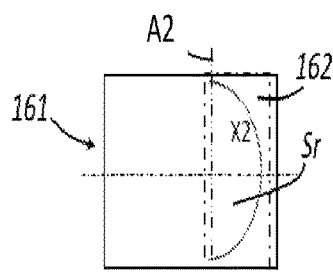
FIG. 13B shows an example image wherein a portion of the image that includes an imaging artifact is cropped out of the image according to some embodiments of the disclosed subject matter.

At 1230, the portion of the image that includes imaging artifact 26 can be cropped out of the image (as shown in FIG. 13B), leaving only the portion of the image within bounding box 162, representing the right side of a specimen. Note, that that the portion of the specimen containing feature X2 is within bounding box 162, and bounding box 162 also incorporates area on each side of specimen centerline A2 to create an overlap area that can be used for alignment and stitching an entire image together. Step 1230, in some examples, is performed by control system 70 and/or computer analysis system 75.

Figure 13C:
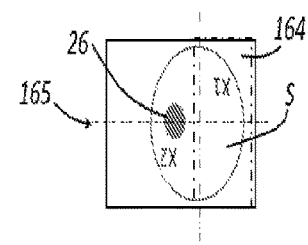
FIG. 13C shows an example image captured at a second position via rotation of the specimen stage of a macro inspection system according to some embodiments of the disclosed subject matter.

At 1240, the stage can be rotated 180°, or other suitable amount, in a clockwise or counter-clockwise direction, from a first position to a second position. An image of the specimen can be captured in this second position. An example image is shown in FIG. 13C. Note, that since the specimen was rotated, features X1 and X2 now appear on opposite sides to their original positions, as captured in image 160, shown in FIG. 13A. Bounding box 164 indicates the portion of the specimen within the image that does not show imaging artifact 26. Note, that the position of the specimen containing feature X1 is within the bounding box and that the bounding box incorporates area on each side of specimen centerline A2 to create an overlap area. Note, specimen stage 150 can be rotated an amount other than 180°, as long as the rotation is sufficient to capture two images that when stitched together will recreate the specimen without including imaging artifact 26.

Figure 13D:
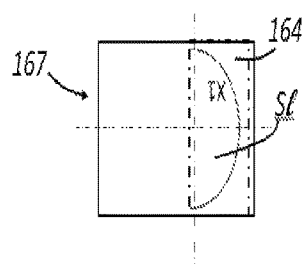
FIG. 13D shows an example image wherein a portion of the image that includes an imaging artifact is cropped out of the image according to some embodiments of the disclosed subject matter.

At 1250, the portion of the image that includes imaging artifact 26 is cropped out of the image (as shown in FIG. 13D), leaving only the portion of the image within bounding box 164, representing the left-hand portion of the specimen, or the portion of the specimen that includes feature X1.

Figure 13E:
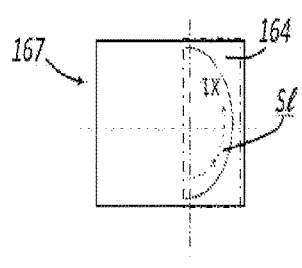
FIG. 13E shows an example of a cropped image being digitally rotated to an original position according to some embodiments of the disclosed subject matter.
Figure 13F:
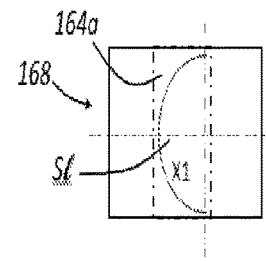
FIG. 13F shows an example of a cropped image digitally rotated to an original position according to some embodiments of the disclosed subject matter.

At 1260, as shown in FIGS. 13E-13F, cropped image 164 can be digitally rotated so that feature X1 appears in its original position (on the bottom left). As described in connection with FIG. 7, the overlapping areas of two images can be compared. If the images do not match, then the focus, exposure, illumination and/or other parameters of macro inspection system 100 can be adjusted and new images captured until a matching pair of images are found.

Figure 13G:
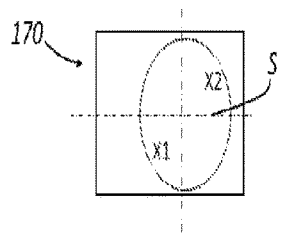
FIG. 13G shows a composite artifact-free image of a specimen generated by stitching two cropped images together according to some embodiments of the disclosed subject matter.

Once matching images are found, cropped image 164 can be stitched together with cropped image 162, as shown in FIG. 13G, to create a composite image of the specimen without imaging artifact 26 (step 1270). In some examples, steps 1250, 1260, and 1270 are performed by control system 70 and/or computer analysis system 75.

Note, although FIG. 12 describes a method for creating an artifact-free image of a specimen by rotating a specimen stage, an artifact-free image of a specimen can also be created by carrying out a similar process, but rotating an imaging assembly, instead of a specimen stage.

Note, the methods described herein for inspection of reflective specimens is not limited to macroscope inspection systems and can also be implemented in microscope inspection systems.

Figure 14:
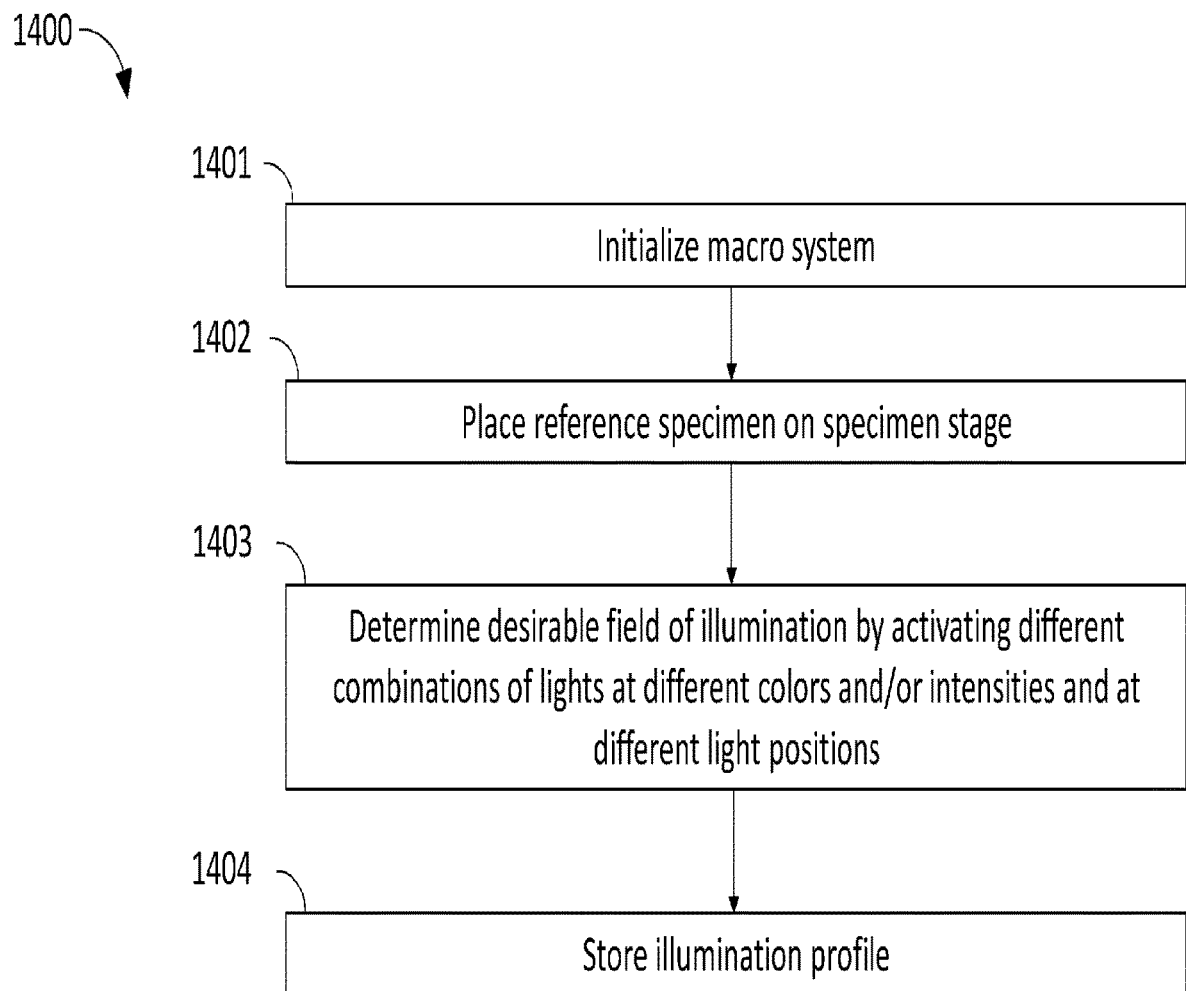
FIG. 14 shows an example calibration method for calibrating macro inspection system to achieve different illumination landscapes according to some embodiments of the disclosed subject matter.

FIG. 14 shows at a high level, an example calibration method 1400 for calibrating macro inspection system to achieve different illumination landscapes, in accordance with some embodiments of the disclosed subject matter. Illumination landscape refers to the color and/or intensity of light on a region of interest of a specimen as a result of the activation and distribution of light from the one or more of the plurality of lights L1 to Ln that is directed towards a specimen. The illumination landscape can affect the image captured by imaging assembly 33. Control system 70 can control the intensity of one or more of the plurality of lights L1 to Ln to provide a desired illumination landscape on a specimen plane and/or specimen stage. For example, control system 70 can control the intensity of one or more of the plurality of lights L1 to Ln to provide an illumination landscape of uniform intensity on a specimen plane and/or specimen stage. The type of illumination landscape provided can be determined by the specimen type, mechanical and/or physical properties of a specimen (e.g., specimen size, specimen reflectivity), a specimen feature being examined, a particular stage of a manufacturing and/or examining process, or some other suitable variable, individually or in any combination thereof. In some embodiments, calibration method 1300 can use macro inspection system 100.

At 1401, control system 70 can initialize macro inspection system 100. In some embodiments, initialization can include determining the configuration of lights L1 to Ln of macro inspection system 100 (e.g., the total number of lights L1 to Ln, the address and location of each light, the position of the light deflector, the area of projection for each light at each possible position (including height and angle) from the light source to the region where the light is projected (collectively, "configuration information"(, and storing the configuration information in local or remote memory.

Methods to define an area of illumination projected by each light L1 to Ln is described in U.S. patent application Ser. No. 16/262,017 entitled "Macro Inspection Systems, Apparatus and Methods," which is hereby incorporated by reference herein in its entirety.

At 1402, a reference specimen with known features and/or mechanical/physical properties (e.g., size, reflectivity) can be placed on a specimen stage. Different combinations of lights L1 to Ln can be activated at different colors and/or intensities, at different possible distances and angles (collectively, "light position" (from the light source to the region where the light is projected to determine a desirable illumination landscape for the reference specimen (at 1403). In some embodiments, the desirable illumination landscape can be determined based on the quality of images captured by imaging assembly 33, based on the measured intensity of light reflected off a specimen S across each individual pixel or pixel groups of imaging assembly 33, based on quality of images displayed on a display screen and/or any other suitable metric. In some embodiments, the illumination landscape can be adjusted by manually activating different combinations of lights L1 to Ln at different colors and/or intensities and at different possible positions until the desired illumination landscape is achieved. In other embodiments, the illumination landscape can be adjusted by programming a set of conditions (e.g., using control system 70 and configuration information of 1401) to turn on different combinations of lights L1 to Ln at different colors and/or intensities and at different light positions until a desired illumination landscape is achieved. When the desired illumination landscape for a reference specimen is achieved, the address (or other identifying information) of the activated lights, the intensity level and color of each selected light, as well as position information for each selected light, the distance (e.g., along the x, y and z axes) between stage and lens 34 and the position of imaging assembly 33 and a specimen stage is relation to each other (collectively "illumination profile" (, can be stored (at 1404) by control system 70 for future use.

This process to find and store an appropriate illumination profile can be repeated for different reference specimens representing different classification groups—e.g. by specimen type, by similar mechanical and/or physical specimen properties (e.g., similar reflectivity properties, similar size dimensions), by feature type, by manufacturing process and/or examination stage, by region of interest and/or any other suitable classification group. This process can also be repeated for the same reference specimen to find different illumination profiles that are appropriate for different attributes of the specimen (e.g., as determined by a specimen's mechanical or physical properties); different specimen features that are being examined; different regions of interest on the specimen and/or the manufacturing/examination process that is being examined. In some embodiments, a reference specimen is first put in focus before an illumination profile is calculated. In further embodiments, the distance between specimen stage and lens 34 is adjusted to different preset distances and an illumination profile is calculated for a reference specimen at each preset distance.

In embodiments where a uniform illumination landscape is desired, a reflective specimen that exhibits a uniform reflective background, as determined by standard measurement of reflectivity, can be used to calibrate macro inspection system 100 to provide a uniform illumination landscape. A background can be considered uniform if the reflectivity (e.g., as measured across each individual pixel or pixel groups of imaging assembly 33) does not vary by more than 5% across the entire field of view of the specimen when viewed on a specimen stage, and preferably less than 2%. In some embodiments, a reference specimen without a uniform reflective background can be used to calibrate macro inspection system 100 to provide a uniform illumination landscape. When such a specimen is used, lens 34 can be used to create a uniform reflective background by defocusing the specimen to blur any foreign objects and surface irregularities on the specimen to create a more uniform reflective background. The illumination landscape can be adjusted by activating different combinations of lights L1 to Ln at different colors and/or intensities and at different possible positions until a uniform illumination landscape is achieved. When a uniform illumination landscape is achieved, the address (or other identifying information) of the activated lights, the intensity and color level of each selected light, as well as light position information for each selected light and the distance between a specimen stage and lens 34 can be stored by control system 70 as an illumination profile that provides uniform illumination for macro inspection system 100, a particular specimen, a specimen class, a region of interest, a particular stage in the manufacturing or examining process, and/or for any other suitable classification group.

It should be understood that at least some of the portions of calibration method 1400 described herein can be performed in any order or sequence not limited to the order and sequence shown in and described in connection with FIG. 14, in some embodiments. Also, some portions of process 1400 described herein can be performed substantially simultaneously where appropriate or in parallel in some embodiments. Additionally, or alternatively, some portions of process 1400 can be omitted in some embodiments. Calibration process 1400 can be implemented in any suitable hardware and/or software. For example, in some embodiments, calibration process 1400 can be implemented in macro inspection system 100. Note, that calibration process 1400 is not limited to macroscope inspection systems and can also be implemented in a microscope inspection system.

Figure 15A:
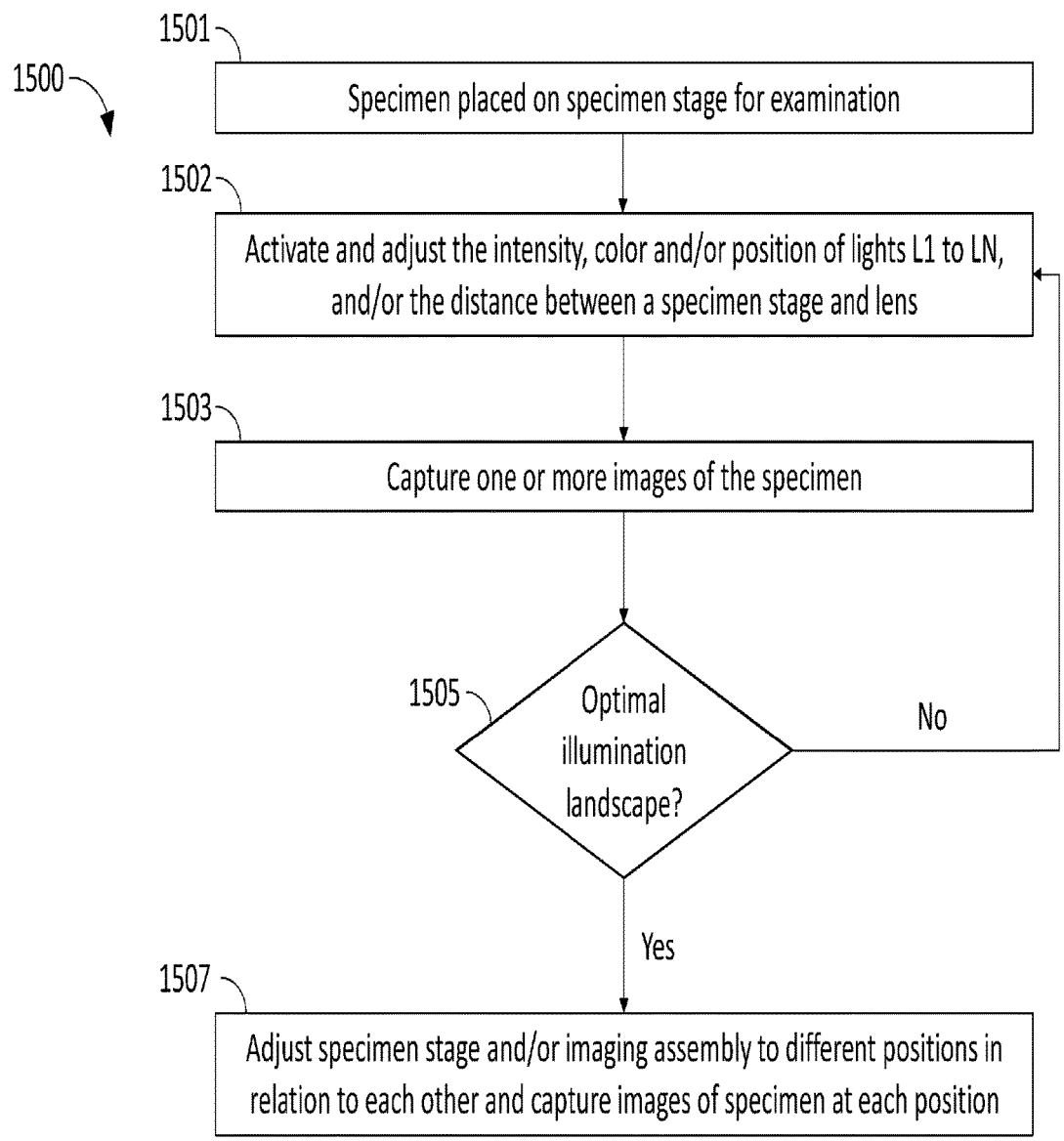
FIG. 15A shows an example method for illuminating a specimen using a macro system to achieve a desired illumination landscape according to some embodiments of the disclosed subject matter.

FIG. 15A shows at a high level, an example method 1500 for illuminating a specimen using a macro system to achieve a desired illumination landscape)"illumination landscape method 1500" (, in accordance with some embodiments of the disclosed subject matter. In some embodiments, illumination landscape method 1500 can use macro inspection system 100.

At 1501, a specimen to be examined can be placed on a specimen stage. In some embodiments, the specimen is brought into focus before the illumination landscape provided by macro inspection system 100 is adjusted.

At 1502, according to some embodiments, control system 70 can activate and adjust the intensity, color and/or pitch of lights L1 to Ln, and/or the distance between the specimen stage and lens 34 according to a stored illumination profile that is selected for the specimen. The illumination profile can be selected manually or automatically based on a computer algorithm that assesses different attributes of the specimen (e.g., as determined by one or more physical and/or mechanical properties of a specimen) and/or different goals of the examination and finds a suitable illumination profile. Methods for selecting a suitable illumination profile are further discussed in connection with FIG. 14.

In some embodiments, after selected lights L1 to Ln are activated at different colors and/or intensity, and the selected lights, and adjustments are made to the intensity, color and/or light position, and/or the distance between specimen stage and lens 34, according to a selected illumination profile, further adjustments can be to modify the selected illumination profile to achieve a desired illumination landscape. In some embodiments, one or more lights L1 to Ln can be activated and adjustments can be made to the intensity, color and/or position of the lights, and/or the distance between a specimen stage and lens 34 without reference to any illumination profile. The activations and/or adjustments can be performed manually or automatically.

Once one or more of lights L1 to Ln are activated, and adjustments are made to their intensity, color and/or light position, as well as to the distance between a specimen stage and lens 34, one or more images of the specimen can be captured and stored for analysis, as at 1503. In some embodiments, the captured specimen images are transmitted to computer analysis system 75.

At 1505, a determination is made by computer analysis system 75 as to whether the applied activation of one or more of lights L1 to Ln, and adjustments to their intensity, color and/or light position, etc. are sufficient to produce a desired illumination landscape. Such determinations may be made based on an analysis of pixel intensity values for image data received during the image capture step of 1503. If the illumination landscape profile is determined to be sub-optimal, then process 1500 can revert back to step 1502, and further adjustments to the illumination landscape can be made. Steps 1502-1505 can iterate until an optimal illumination profile is achieved. By way of example, if an illumination landscape with a uniform light intensity profile is desired for a particular specimen type, but the image data associated with the captured one or more specimen images indicate that some regions are insufficiently illuminated, then step 1505 can revert back to step 1502. In step 1502, additional changes to light activation, intensity, position (elevation and/or pivot/rotation), etc. can be made. Once changes have been applied to the illumination landscape, step 1503 is repeated and image data is collected from the specimen under the new conditions, e.g., by an image capture device. Again, at step 1505, the new illumination landscape is analyzed to determine if optimal lighting conditions have been achieved.

Different illumination profiles can be selected for a specimen, and for each selected illumination profile, control system 70 can activate and adjust the intensity, color and/or position of lights L1 to Ln, and/or distance between a specimen stage and lens 34 according to the selected profile, and capture and store one or more images of the specimen. As such, the iterative process of steps 1502-1505 can differ with specimen type, as the initially applied illumination landscape that is applied at step 1502 may vary with specimen type, region of interest, a particular stage in the manufacturing or examining process, and/or for any other suitable classification group. In some embodiments, once the illumination is configured according to a selected illumination profile, at step 1507, a specimen stage and/or imaging assembly 33 can be adjusted to different positions in relation to each other and one or more images of the specimen can be captured at each position.

Figure 15B:
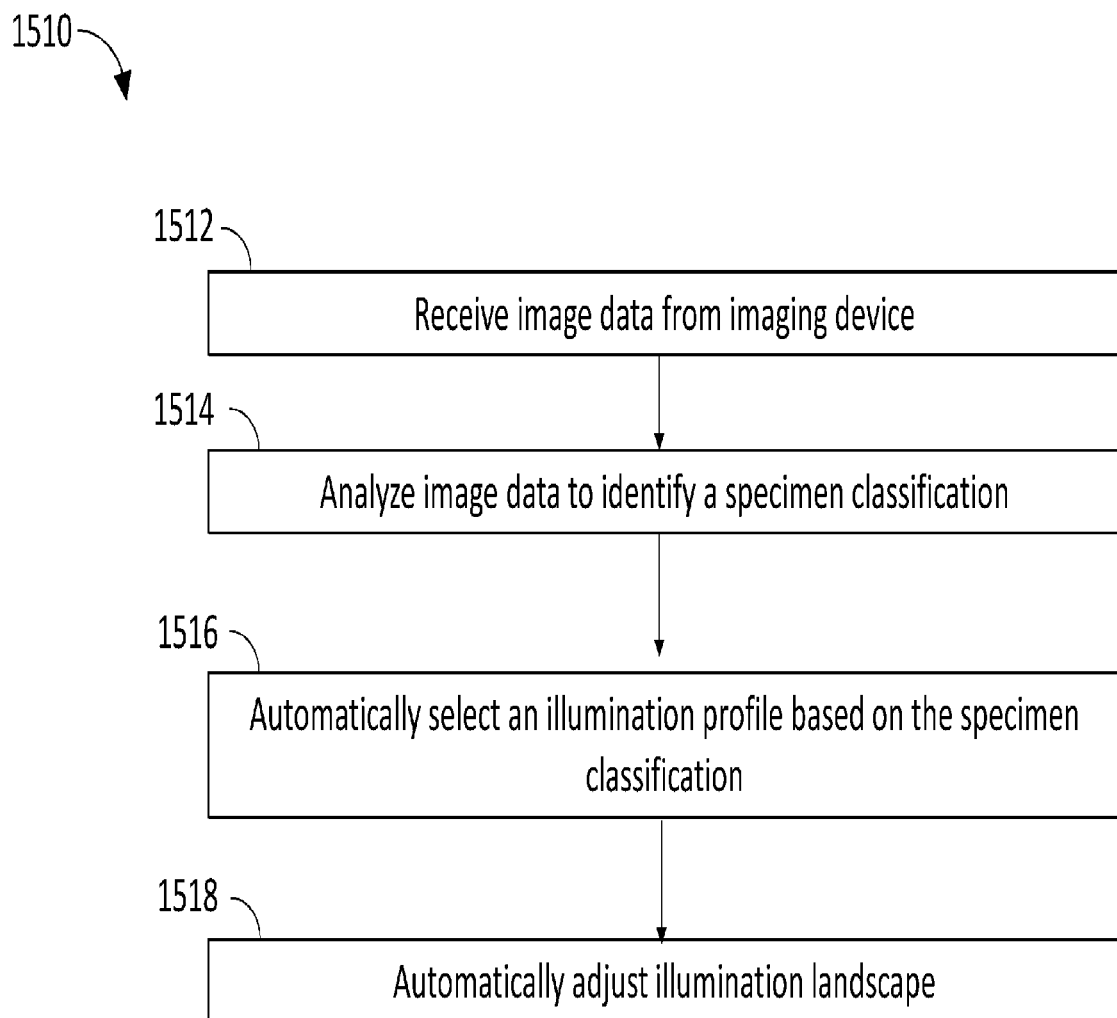
FIG. 15B shows an example method for identifying a specimen classification and automatically adjusting an illumination landscape of the macro inspection system according to some embodiments of the disclosed subject matter.

FIG. 15B illustrates steps of an example process 1510 for identifying a specimen classification and automatically adjusting an illumination landscape of the macro inspection apparatus, according to some aspects of the disclosed technology. Process 1510 begins with step 1512 which image data is received, for example, by an image processing system e.g., image processing system 1634, discussed above. In some approaches, the image data can be included in a received image of a specimen that is taken by an imaging device, as part of macro inspection system 100. The image data can include all or a portion of a specimen that is disposed on a stage of macro inspection system 100. In some instances, that image data may only comprise pixel intensity values, indicating an intensity of light reflected from different portions of a specimen surface.

In step 1514, the image data is analyzed to identify a classification of the specimen. In some instances image analysis may be performed to identify a subset of the specimen, such as a particular region or feature. As discussed below, machine learning classifiers, computer visions and/or artificial intelligence can be used to identify/classify the specimen.

Subsequently, an illumination profile can be automatically selected based on the specimen (or feature) classification and/or a particular stage in the manufacturing or examining process. The specimen/feature classification can be used to query an illumination profile database that contains one or more illumination profiles associated with specimen and/or specimen feature types. By referencing the specimen classification determined in step 1514, a matching illumination profile can be automatically identified and retrieved. As discussed above, the illumination profile can contain a variety of settings data that describe configurations of macro inspection system 100 that can be used to achieve the optimal illumination landscape for the specimen or feature being observed.

It should be understood that at least some of the portions of illumination landscape method 1500 described herein can be performed in any order or sequence not limited to the order and sequence shown in and described in connection with FIGS. 15A and 15B, in some embodiments. Also, some portions of process 1300 described herein can be performed substantially simultaneously where appropriate or in parallel in some embodiments. Additionally, or alternatively, some portions of process 1500 can be omitted in some embodiments. Illumination landscape method 1500 can be implemented in any suitable hardware and/or software. For example, in some embodiments, illumination landscape method 1500 can be implemented in macro inspection system 100. Note, that illumination landscape method 1500 is not limited to macroscope inspection systems and can also be implemented in microscope inspection systems.

Figure 16:
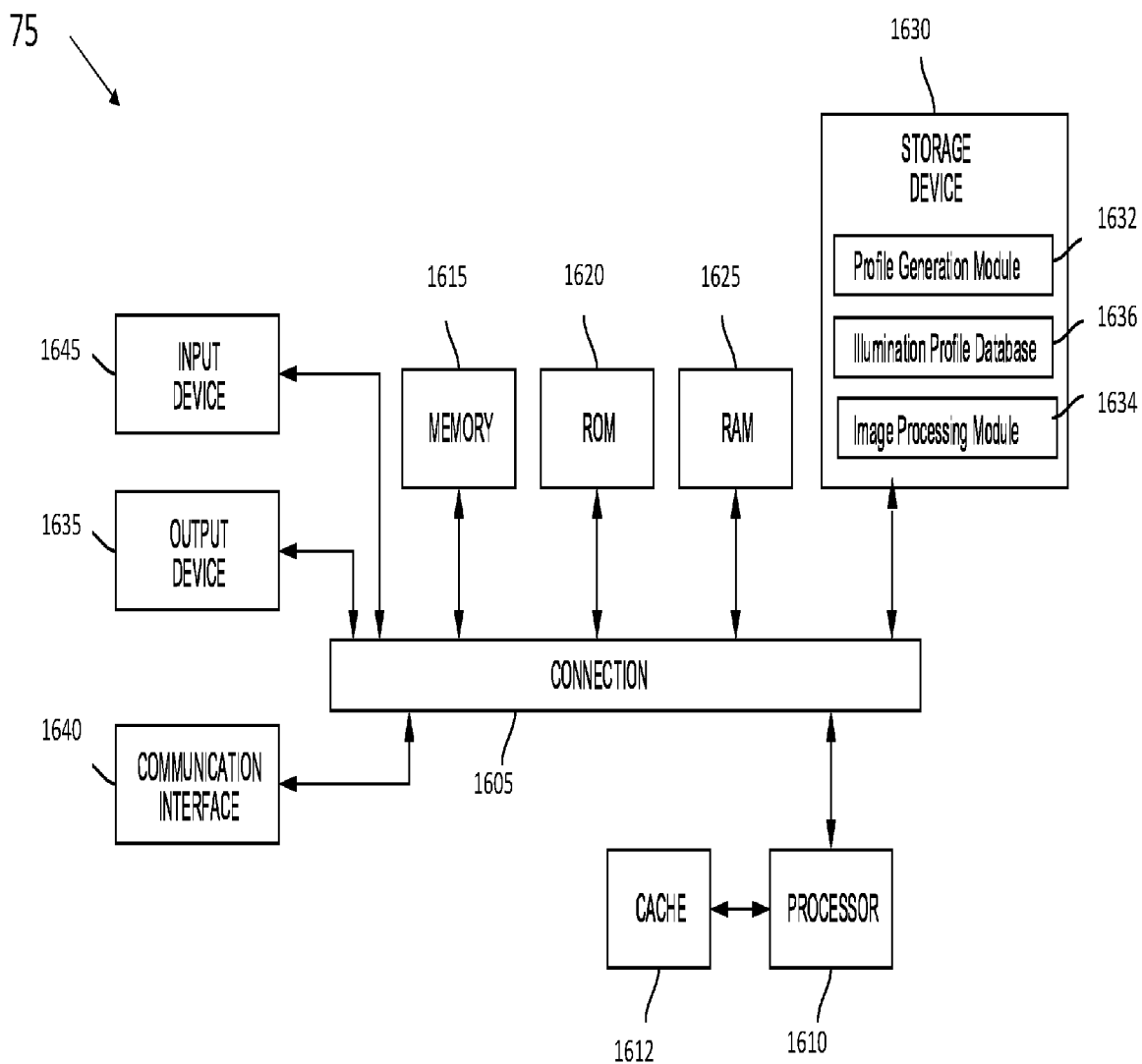
FIG. 16 shows the general configuration of an embodiment of computer analysis system according to some embodiments of the disclosed subject matter.

FIG. 16 shows the general configuration of an embodiment of computer analysis system 75, in accordance with some embodiments of the disclosed subject matter. Although computer analysis system 75 is illustrated as a localized computing system in which various components are coupled via a bus 1605, it is understood that various components and functional computational units (modules) can be implemented as separate physical or virtual systems. For example, one or more components and/or modules can be implemented in physically separate and remote devices, such as, using virtual processes (e.g., virtual machines or containers) instantiated in a cloud environment.

Computer analysis system 75 includes a processing unit (e.g., CPU/s and/or processor/s) 1610 and bus 1605 that couples various system components including system memory 1615, such as read only memory (ROM) 1620 and random access memory (RAM) 1625, to processor/s 1610.

Memory 1615 can include various memory types with different performance characteristics. Processor 1610 is coupled to storage device 1630, which is configured to store software and instructions necessary for implementing one or more functional modules and/or database systems, such as profile generation module 1632, illumination profile database 1636, and imaging processing module 1634. Each of these modules can be configured to control processor 1610 as well as a special-purpose processor where software instructions are incorporated into the actual processor design. As such, processor 1610 and one or more of profile generation module 1632, illumination profile database 1636, and imaging processing module 1634 can be completely self-contained systems. For example, imagine processing module 1634 can be implemented as a discrete image processing system, without departing from the scope of the disclosed technology.

To enable user interaction with computer analysis system 75, input device 1645 can represent any number of input mechanisms, such as a microphone for speech, a touch-sensitive screen for gesture or graphical input, keyboard, mouse, motion input and so forth. An output device 1635 can also be one or more of a number of output mechanisms known to those of skill in the art. In some instances, multimodal systems can enable a user to provide multiple types of input to communicate with computer analysis system 75, for example, to convey specimen information relating to a specimen type/classification, or other characteristics. Communications interface 1640 can generally govern and manage the user input and system output. There is no restriction on operating on any particular hardware arrangement and therefore the basic features here may easily be substituted for improved hardware or firmware arrangements as they are developed.

Storage device 1630 is a non-transitory memory and can be a hard disk or other types of computer readable media that can store data accessible by a computer, such as magnetic cassettes, flash memory cards, solid state memory devices, digital versatile disks, cartridges, random access memories (RAMs) 1525, read only memory (ROM) 1520, and hybrids thereof.

In practice, illumination profile generation module 1632 can be configured to receive a scan of a specimen, or a portion of a specimen (collectively, "specimen image" (, from macro inspection system 100, and/or any suitable computer readable media. In some instances, preferred illumination landscapes associated with configurations of the various macro components of macro inspection system 100 can be associated to form an illumination profile, for example, that is associated with the specimen type or classification. Illumination profiles associating illumination landscape settings with specimen classification types can be stored to illumination profile database 1636.

Illumination profiles stored to illumination profile database 1636 can include specific context data such as: a configuration of lights L1 to Ln of macro inspection system 100 (e.g., the total number of lights L1 to Ln, the address and location of each light, the position of light deflector 83, the area of projection for each light at each possible position that it can be located (including height and angle) from the light source to the region where the light is projected); the range of possible distances between specimen stage and lens 34; the range of different positions of specimen stage and imaging assembly 33 in relation to each other, regions of interest for particular types of specimen; a particular stage of a manufacturing or examining process that is being examined; a feature that is being examined.

Image processing system 1634 can be used in conjunction with profile generation module 1632 and illumination profile database 1636 to classify a specimen based on the image data received in the specimen image(s) and/or other received specimen characteristics, such as those manually provided by a user, for example, via input device 1645. Additionally, image processing system can be configured to classify specific specimen features, determine other physical and/or mechanical specimen properties (e.g., specimen reflectivity, specimen dimensions). Classifications of specimen types, and specimen features/properties can be stored as part of an illumination profile. As such, various illumination profiles stored in illumination profile database 1636 can contain settings and parameters used to generate an optimal illumination landscape that can be referenced and matched to a sample based on sample type and or specific features or characteristics.

In some aspects, classification of a specimen type and/or features of a specimen can be performed using image processing algorithms that can include computer vision, one or more artificial intelligence algorithm(s) and/or computer algorithms. Classification of a specimen, or features of a specimen, can also be based on, e.g., a computer aided design (CAD) file of a specimen and/or features of a specimen, a specimen layout map identifying features on a specimen, images of known specimens and/or features, and/or information about known specimens (e.g., a specimen's dimensions, the mechanical and/or physical properties of a specimen).

In some instances, machine learning models can be used to perform classification of specimens, specimen features, and/or other specimen characteristics. In some aspects, image data from specimen images can be provided as an input to a machine learning classification system, for example, by image processing system 1634. Classifier output can specify a sample or feature classification that can then be used to reference an illumination profile stored in illumination profile database 1636. By matching the correct illumination profile with the correct sample classification or feature type, the correct illumination landscape can be achieved through the automatic calibration of light intensity, light color, lighting angle, and elevation above the specimen, etc.

As understood by those of skill in the art, machine learning based classification techniques can vary depending on the desired implementation, without departing from the disclosed technology. For example, machine learning classification schemes can utilize one or more of the following, alone or in combination: hidden Markov models; recurrent neural networks; convolutional neural networks; Bayesian symbolic methods; general adversarial networks; support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean LSH algorithm), and/or an anomaly detection algorithm, such as a Local outlier factor. Additionally, machie learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Such algorithms, networks, machines and systems provide examples of structures used with respect to any "means for determining an illumination profile for a specimen using artificial intelligence."

In some embodiments, machine learning can be deployed in the creation of illumination profiles. For example, profile generation module 1632 can input the context data, along with the specimen image or data determined from the specimen image)"specimen data" (into a trained artificial intelligence algorithm to create one or more appropriate illumination profiles to be applied to illuminate a specimen. In other embodiments, image processing system 1634 can use machine learning models or other computer algorithms to select a predefined illumination profile based on the specimen image, specimen data and/or context data, as discussed above.

Once the desired illumination profile has been selected, e.g., from illumination profile database 1636, the illumination profile data can be transmitted to control system 70. Control system 70 can use this information in connection with process 1400 to apply an illumination profile to illuminate a specimen being examined.

Examples of artificial intelligence based image processing algorithm that can be used by illumination profile generation module 1632 is image registration as described by: Barbara Zitova, "Image Registration Methods: A Survey," Image and Vision Computing, Oct. 11, 2003, Volume 21, Issue 11, pp. 977-1000, which is hereby incorporated by reference herein in its entirety. The disclosed methods are just examples and are not intended to be limiting.

In some embodiments, the machine learning algorithms used by illumination profile generation module 1632, and image processing system 1634, including, in some embodiments, an image processing algorithm, is first trained with training data so that illumination profile generation module 1632 can create an appropriate illumination profile for a specimen.

Figure 17:
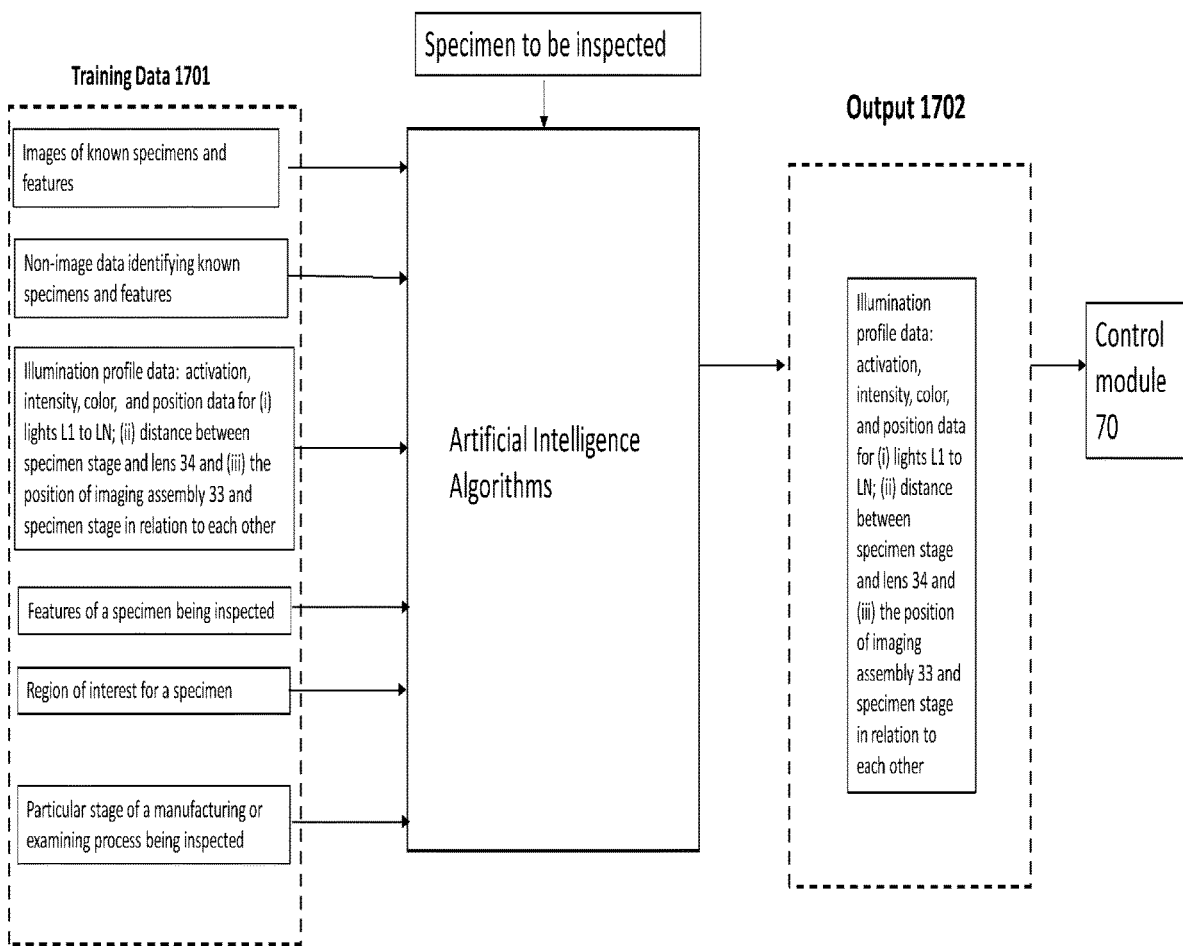
FIG. 17 shows an example of using training data to train one or more artificial intelligence algorithms that can be used on a received specimen scan to create one or more illumination profiles for each received specimen image according to some embodiments of the disclosed subject matter.

As shown in FIG. 17, training data 1701 can include labeled images of known specimens and features captured by a macro inspection system according to embodiments of the disclosed subject. The labeled images selected for training can be images of desired quality that show suitable detail based on an inspection objective for the captured images. In some embodiments, training data 1701 can include non-image files identifying the type of specimen and/or features being inspected. Training data can further include for each image: data describing the activation, intensity, color, position data for (i) lights L1 to Ln; (ii) the distance (along the x, y and z axes) between a specimen stage and lens 34; and (iii) the position of the specimen stage and imaging assembly 33 in relationship to each other, the features of a specimen being inspected; the region of interest on the specimen being inspected; the particular stage of a manufacturing or examining process being inspected. In some embodiments training data can include physical/mechanical properties of a specimen, and/or any other suitable characteristic used to create an appropriate illumination profile. In some embodiments, training data can also include unlabeled data.

Once the artificial intelligence algorithm used by illumination profile generation module 1632 is trained, it can be applied by illumination profile generation module 1632 to a received specimen scan to create one or more illumination profiles (output data 1702) for each received specimen image. As described above, illumination profile data can include data identifying which lights L1 to Ln to activate, and at what intensity, color and light position. Illumination profile data can also include a distance (e.g., along the x, y and z axis) between a specimen stage and lens 34, as well as the position of the specimen stage and imaging assembly 33 in relation to each other.

Note that macro inspection system 100 can include other suitable components not shown. Additionally or alternatively, some of the components included in macro inspection system 100 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The macroscopic inspection system of the subject invention can practice all or part of the recited methods, can be a part of the recited systems, and/or can operate according to instructions in the recited non-transitory computer-readable storage media. Such logical operations can be implemented as modules configured to control the processor to perform particular functions according to the programming of the module.

The various systems, methods, and computer readable mediums described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices. Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The system, method and apparatus for macroscopic inspection of reflective specimen have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure. The scope of the present disclosure is limited only by the claims that follow.

Statements of this disclosure include:

Statement 1. An inspection apparatus, comprising: a specimen stage configured to retain a specimen, one or more imaging devices positioned above the specimen stage to capture one or more images of the specimen from the specimen stage; a set of lights disposed on a platform between the specimen stage and the imaging device; and a control system coupled to the specimen stage, the one or more imaging devices, and the platform, the control system comprising: one or more processors; and memory storing executable instructions that, as a result of being executed by the one or more processors, cause the control system to: provide first instructions to the one or more imaging devices to capture a first image of the specimen, the first image comprising a first imaging artifact to a first side of a reference point; provide second instructions to the one or more imaging devices to capture a second image of the specimen, the second image comprising a second imaging artifact to a second side of the reference point; crop the first imaging artifact from the first image and the second imaging artifact from the second image; and digitally stitch together the first image and the second image to generate a composite image of the specimen, the composite image lacking the first imaging artifact and the second imaging artifact.

Statement 2. An inspection apparatus according to Statement 1, wherein the executable instructions further cause the control system to: translate the one or more imaging devices in a first direction to a first position above and to the first side of the reference point to capture the first image of the specimen; and translate the one or more imaging devices in a second direction to a second position above and to the second side of the reference point to capture the second image of the specimen.

Statement 3. An inspection apparatus according to any of Statements 1 and 2, wherein the executable instructions further cause the control system to: translate the specimen stage to a first position under and to the first side of the reference point to capture the first image of the specimen; and translate the specimen stage in a second direction under and to the second side of the reference point to capture the second image of the specimen.

Statement 4. An inspection apparatus according to any of Statements 1 through 3, wherein the reference point is positioned along a centerline of the specimen.

Statement 5. An inspection apparatus according to any of Statements 1 through 4, wherein the imaging device is moveable along a rotational axis.

Statement 6. An inspection apparatus according to any of Statements 1 through 5, wherein: the one or more imaging devices include: a first imaging device positioned above and over to the first side of the reference point; and a second imaging device positioned above and over to the second side of the reference point; and the inspection apparatus further comprises an aperture slider positioned below the first imaging device and the second imaging device, the aperture slider comprising an aperture to allow capture of images of the specimen using either the first imaging device or the second imaging device.

Statement 7. An inspection apparatus according to Statement 6, wherein: the control system translates the aperture slider to a first position such that the aperture is aligned with the first imaging device to capture the first image; and the control system translates the aperture slider to a second position such that the aperture is aligned with the second imaging device to capture the second image.

Statement 8. An inspection apparatus according to any of Statements 1 through 7, wherein the executable instructions further cause the control system to: translate the platform; activate one or more combinations of the set of lights to determine an illumination profile; analyze the first image of the specimen to identify a specimen classification; select, based on the specimen classification, the illumination profile; and adjust the platform and the set of lights according to the illumination profile.

Statement 9. An inspection apparatus according to any of Statements 1 through 8, further comprising a barrier configured to diffuse light reflected from the specimen retained on the specimen stage back onto the specimen.

Statement 10. An inspection apparatus according to any of Statements 1 through 9, wherein the executable instructions further cause the controlling system to compare a first overlap area of the first image to a second overlap area of the second image to determine that a matching image has been identified to allow for digital stitching of the first image and the second image.

Statement 11. A method, comprising: receiving a specimen on a specimen stage of an inspection apparatus; identifying a reference point for the inspection system; capturing a first image of the specimen, the first image comprising a first imaging artifact to a first side of the reference point; capturing a second image of the specimen, the second image comprising a second imaging artifact to a second side of the reference point; evaluating the second image of the specimen to determine that the second image is usable with the first image to generate a composite image of the specimen; cropping the first imaging artifact from the first image and the second imaging artifact from the second image; and digitally stitching together the first image and the second image to generate the composite image of the specimen, the composite image lacking the first imaging artifact and the second imaging artifact.

Statement 12. A method according to Statement 11, wherein the method further comprises: translating an imaging device of the inspection apparatus in a first direction to a first position above and to the first side of the reference point to capture the first image; and translating the imaging device in a second direction to a second position above and to the second side of the reference point to capture the second image.

Statement 13. A method according to any of Statements 11 and 12, wherein the method further comprises: translating the specimen stage in a first direction to a first position under and to the first side of the reference point to capture the first image; and translating the specimen stage to a second position under and to the second side of the reference point to capture the second image.

Statement 14. A method according to any of Statements 11 through 13, wherein the method further comprises: rotating the specimen stage to a first position to capture the first image; cropping the first image to remove a first portion of the first image, the first portion including the first imaging artifact; rotating the specimen stage to a second position to capture the second image; cropping the second image to remove a second portion of the second image, the second portion including the second imaging artifact; and digitally rotating the second image to initiate evaluation of the second image.

Statement 15. A method according to any of Statements 11 through 14, wherein the method further comprises: translating an aperture slider of the inspection apparatus in a first direction to position an aperture below a first imaging device of the inspection apparatus to capture the first image, the first imaging device being positioned above and to the first side of the reference point; and translating the aperture slider of the inspection apparatus in a second direction to position the aperture below a second imaging device of the inspection apparatus to capture the second image, the second imaging device being positioned above and to the second side of the reference point.

Statement 16. A method according to any of Statements 11 through 15, further comprising: translating a platform of the inspection system, wherein a set of lights are disposed on the platform; activating one or more combinations of the set of lights to determine an illumination profile; analyzing the first image of the specimen to identify a specimen classification; selecting, based on the specimen classification, the illumination profile; and adjusting the platform and the set of lights according to the illumination profile.

Statement 17. A method according to any of Statements 11 through 16, further comprising: rotating an imaging device of the inspection apparatus in a first direction to position the imaging device to the first side of the reference point to capture the first image; and rotating the imaging device of the inspection apparatus in a second direction to position the imaging device to the second side of the reference point to capture the second image.

Statement 18. A method according to any of Statements 11 through 17, further comprising: diffusing light reflected from the specimen retained on the specimen stage back onto the specimen.

Statement 19. A method according to any of Statements 11 through 18, wherein the method further comprises: comparing a first overlap area of the first image to a second overlap area of the second image to determine that a matching image has been identified to allow for digital stitching of the first image and the second image.

Statement 20. A method according to any of Statements 11 through 19, wherein the specimen stage is moveable along an X axis, a Y axis, a Z axis, and a rotational axis.

The invention claimed is:

1. A method, comprising:
generating, by a computing system, a training data set for training a machine learning model to generate an illumination profile for illuminating a specimen under examination in a macro inspection system, the training data set comprising images of known specimens and illumination profile data corresponding to the images of known specimens;
training, by the computing system, the machine learning model to generate illumination profiles for illuminating specimens under examination based on the training data set, wherein the machine learning model learns features of the known specimens and correlates the learned features with the illumination profile data;
determining, by the computing system, that the machine learning model has achieved a threshold level of accuracy in generating the illumination profiles for illuminating specimens under examination; and
based on the determining, deploying, by the computing system, the machine learning model in a macro inspection environment.

2. The method of claim 1, wherein the training data set further comprises:
non-image data identifying known specimens and features of the known specimens.

3. The method of claim 1, wherein the illumination profile data in the training data set comprises one or more of an activation value, an intensity value, or a color value of each light utilized for examination.

4. The method of claim 1, wherein the training data set further comprises:
a region of interest for each of the known specimens.

5. The method of claim 1, wherein the training data set further comprises:
an indication of a particular stage of manufacturing for the known specimen undergoing the examination.

6. The method of claim 1, wherein training, by the computing system, the machine learning model to generate the illumination profiles comprises:
training the machine learning model to predict one or more of an activation value, an intensity value, or a color value of each light utilized for examination.

7. The method of claim 1, wherein the training data set comprises:
a distance of the known specimen to a lens of the macro inspection system.

8. A non-transitory computer readable medium comprising one or more sequences of instructions, which, when executed by one or more processors, causes a computing system to perform operations comprising:
generating, by the computing system, a training data set for training a machine learning model to generate an illumination profile for illuminating a specimen under examination in a macro inspection system, the training data set comprising images of known specimens and illumination profile data corresponding to the images of known specimens;
training, by the computing system, the machine learning model to generate illumination profiles for illuminating specimens under examination based on the training data set, wherein the machine learning model learns features of the known specimens and correlates the learned features with the illumination profile data;
determining, by the computing system, that the machine learning model has achieved a threshold level of accuracy in generating the illumination profiles for illuminating specimens under examination; and
based on the determining, deploying, by the computing system, the machine learning model in a macro inspection environment.

9. The non-transitory computer readable medium of claim 8, wherein the training data set further comprises:
non-image data identifying known specimens and features of the known specimens.

10. The non-transitory computer readable medium of claim 8, wherein the illumination profile data in the training data set comprises one or more of an activation value, an intensity value, or a color value of each light utilized for examination.

11. The non-transitory computer readable medium of claim 8, wherein the training data set further comprises:
a region of interest for each of the known specimens.

12. The non-transitory computer readable medium of claim 8, wherein the training data set further comprises:

an indication of a particular stage of manufacturing for the known specimen undergoing the examination.

13. The non-transitory computer readable medium of claim 8, wherein training, by the computing system, the machine learning model to generate the illumination profiles comprises:
training the machine learning model to predict one or more of an activation value, an intensity value, or a color value of each light utilized for examination.

14. The non-transitory computer readable medium of claim 8, wherein the training data set comprises:
a distance of the known specimen to a lens of the macro inspection system.

15. A system comprising:
a processor; and
a memory having programming instructions stored thereon, which, when executed by the processor, causes a computing system to perform operations comprising:
generating, by the computing system, a training data set for training a machine learning model to generate an illumination profile for illuminating a specimen under examination in a macro inspection system, the training data set comprising images of known specimens and illumination profile data corresponding to the images of known specimens;
training, by the computing system, the machine learning model to generate illumination profiles for illuminating specimens under examination based on the training data set, wherein the machine learning model learns features of the known specimens and correlates the learned features with the illumination profile data;
determining, by the computing system, that the machine learning model has achieved a threshold level of accuracy in generating the illumination profiles for illuminating specimens under examination; and
based on the determining, deploying, by the computing system, the machine learning model in a macro inspection environment.

16. The system of claim 15, wherein the training data set further comprises:
non-image data identifying known specimens and features of the known specimens.

17. The system of claim 15, wherein the illumination profile data in the training data set comprises one or more of an activation value, an intensity value, or a color value of each light utilized for examination.

18. The system of claim 15, wherein the training data set further comprises:
a region of interest for each of the known specimens.

19. The system of claim 15, wherein the training data set further comprises:
an indication of a particular stage of manufacturing for the known specimen undergoing the examination.

20. The system of claim 15, wherein training, by the computing system, the machine learning model to generate the illumination profiles comprises:
training the machine learning model to predict one or more of an activation value, an intensity value, or a color value of each light utilized for examination.

* * * * *